US010225666B2

(12) United States Patent
Van Dijk et al.

(10) Patent No.: US 10,225,666 B2
(45) Date of Patent: Mar. 5, 2019

(54) ADVANCED MANAGEMENT OF AN IMPLANTABLE SOUND MANAGEMENT SYSTEM

(71) Applicant: Cochlear Limited, Macquarie University, NSW (AU)

(72) Inventors: Bastiaan Van Dijk, Mechelen (BE); Wilson Kun Hao Fung, Sydney (AU); Mark Alan Von Huben, Macquarie University (AU)

(73) Assignee: Cochlear Limited, Macquarie University, NSW (AU)

( * ) Notice: Subject to any disclaimer, the term of this patent is extended or adjusted under 35 U.S.C. 154(b) by 173 days.

(21) Appl. No.: 15/009,240

(22) Filed: Jan. 28, 2016

(65) Prior Publication Data
US 2016/0345107 A1    Nov. 24, 2016

Related U.S. Application Data

(60) Provisional application No. 62/164,669, filed on May 21, 2015.

(51) Int. Cl.
*H04R 25/00*    (2006.01)
*H04R 3/00*    (2006.01)

(52) U.S. Cl.
CPC .......... *H04R 25/505* (2013.01); *H04R 3/005* (2013.01); *H04R 25/305* (2013.01); *H04R 2225/67* (2013.01); *H04R 2460/01* (2013.01)

(58) Field of Classification Search
CPC .... H04R 25/305; H04R 25/43; H04R 25/453; H04R 25/502; H04R 25/505; H04R 25/606; H04R 2225/43; H04R 2225/67; H04R 2460/01; A61N 1/36032
See application file for complete search history.

(56) References Cited

U.S. PATENT DOCUMENTS

| 4,443,666 | A | 4/1984 | Cote |
| 4,450,930 | A | 5/1984 | Killion |
| 4,504,703 | A | 3/1985 | Schneiter et al. |
| 4,532,930 | A | 8/1985 | Crosby et al. |
| 4,606,329 | A | 8/1986 | Hough |
| 4,607,383 | A | 8/1986 | Ingalls |
| 4,621,171 | A | 11/1986 | Wada et al. |

(Continued)

FOREIGN PATENT DOCUMENTS

| EP | 1052881 A2 | 11/2000 |
| JP | 2004048207 A | 2/2004 |

(Continued)

OTHER PUBLICATIONS

H. Peter Zenner et al., "Totally implantable hearing device for sensorineural hearing loss," The Lancet, Nov. 8, 1998, p. 1751, vol. 352, No. 9142, Research Letters.

(Continued)

*Primary Examiner* — Joshua Kaufman
(74) *Attorney, Agent, or Firm* — Pilloff & Passino LLP; Martin J. Cosenza

(57) ABSTRACT

A hearing prosthesis, including an implantable microphone, and a sound management system, wherein the hearing prosthesis is configured to set an operational parameter of the sound management system based on input from a microphone external to the recipient of the implantable microphone.

26 Claims, 21 Drawing Sheets

(56) References Cited

U.S. PATENT DOCUMENTS

| | | |
|---|---|---|
| 4,774,933 A | 10/1988 | Hough et al. |
| 4,815,560 A | 3/1989 | Madaffari |
| 4,837,833 A | 6/1989 | Madaffari |
| RE33,170 E | 2/1990 | Byers |
| 4,932,405 A | 6/1990 | Peeters et al. |
| 4,936,305 A | 6/1990 | Ashtiani et al. |
| 5,001,763 A | 3/1991 | Moseley |
| 5,015,224 A | 5/1991 | Maniglia |
| 5,105,811 A | 4/1992 | Kuzma |
| 5,163,957 A | 11/1992 | Sade et al. |
| 5,176,620 A | 1/1993 | Gilman |
| 5,277,694 A | 1/1994 | Leysieffer et al. |
| 5,363,452 A | 11/1994 | Anderson |
| 5,402,496 A | 3/1995 | Soli |
| 5,411,467 A | 5/1995 | Hartmann et al. |
| 5,456,654 A | 10/1995 | Ball |
| 5,475,759 A | 12/1995 | Engebretson |
| 5,500,902 A | 3/1996 | Stockham, Jr. et al. |
| 5,554,096 A | 9/1996 | Ball |
| 5,558,618 A | 9/1996 | Maniglia |
| 5,624,376 A | 4/1997 | Ball et al. |
| 5,680,467 A | 10/1997 | Hansen |
| 5,702,431 A | 12/1997 | Wang et al. |
| 5,749,912 A | 5/1998 | Zhang et al. |
| 5,754,662 A | 5/1998 | Jolly et al. |
| 5,762,583 A | 6/1998 | Adams et al. |
| 5,795,287 A | 8/1998 | Ball et al. |
| 5,800,336 A | 9/1998 | Ball et al. |
| 5,814,095 A | 9/1998 | Muller et al. |
| 5,842,967 A | 12/1998 | Kroll |
| 5,848,171 A | 12/1998 | Stockham, Jr. et al. |
| 5,857,958 A | 1/1999 | Ball et al. |
| 5,859,916 A | 1/1999 | Ball et al. |
| 5,881,158 A | 3/1999 | Lesinski et al. |
| 5,888,187 A | 3/1999 | Jaeger et al. |
| 5,897,486 A | 4/1999 | Ball et al. |
| 5,906,635 A | 5/1999 | Maniglia |
| 5,912,977 A | 6/1999 | Gottschalk-Schoenig |
| 5,913,815 A | 6/1999 | Ball et al. |
| 5,951,601 A | 9/1999 | Lesinski et al. |
| 6,031,922 A | 2/2000 | Tibbetts |
| 6,044,162 A | 3/2000 | Mead et al. |
| 6,072,884 A | 6/2000 | Kates |
| 6,072,885 A | 6/2000 | Stockham, Jr. et al. |
| 6,097,823 A | 8/2000 | Kuo |
| 6,104,822 A | 8/2000 | Melanson et al. |
| 6,108,431 A | 8/2000 | Bachler |
| 6,128,392 A | 10/2000 | Leysieffer et al. |
| 6,134,329 A | 10/2000 | Gao et al. |
| 6,151,400 A | 11/2000 | Seligman |
| 6,163,287 A | 12/2000 | Huang |
| 6,173,063 B1 | 1/2001 | Melanson |
| 6,198,971 B1 | 3/2001 | Leysieffer |
| 6,330,339 B1 | 12/2001 | Ishige et al. |
| 6,381,336 B1 | 4/2002 | Lesinski et al. |
| 6,422,991 B1 | 7/2002 | Jaeger |
| 6,626,822 B1 | 9/2003 | Jaeger et al. |
| 6,688,169 B2 | 2/2004 | Choe et al. |
| 6,707,920 B2 | 3/2004 | Miller |
| 6,736,771 B2 | 5/2004 | Sokolich et al. |
| 6,807,445 B2 | 10/2004 | Baumann et al. |
| 7,024,011 B1 | 4/2006 | Hamacher et al. |
| 7,214,179 B2 | 5/2007 | Miller, III et al. |
| 2002/0191799 A1 | 12/2002 | Nordqvist |
| 2004/0066944 A1 | 4/2004 | Leenen et al. |
| 2005/0222487 A1 | 10/2005 | Miller, III et al. |
| 2006/0155346 A1 | 7/2006 | Miller, III |
| 2007/0154030 A1 | 7/2007 | Moses |
| 2008/0147144 A1* | 6/2008 | Money ............... A61N 1/36036 607/57 |
| 2009/0112051 A1 | 4/2009 | Miller, III |
| 2010/0310084 A1 | 12/2010 | Hersbach |
| 2011/0098785 A1* | 4/2011 | Mishra ............... A61N 1/36032 607/57 |
| 2012/0232333 A1* | 9/2012 | Miller, III ............ H04R 25/606 600/25 |
| 2014/0003640 A1 | 1/2014 | Puria et al. |
| 2015/0119635 A1* | 4/2015 | Gustafsson ........... A61F 11/045 600/25 |

FOREIGN PATENT DOCUMENTS

| | | |
|---|---|---|
| JP | 2010-154432 A | 7/2010 |
| KR | 1020050117850 A | 12/2005 |
| WO | 2006/037156 A1 | 4/2006 |
| WO | 2006/076531 A2 | 7/2006 |

OTHER PUBLICATIONS

International Search Report and Written Opinion for PCT/IB2016/052978, dated Aug. 19, 2016.

* cited by examiner

ADVANCED MANAGEMENT OF AN IMPLANTABLE SOUND MANAGEMENT SYSTEM

CROSS-REFERENCE TO RELATED APPLICATIONS

This application claims priority to Provisional U.S. Patent Application No. 62/164,669, entitled ADVANCED MANAGEMENT OF AN IMPLANTABLE SOUND MANAGEMENT SYSTEM, filed on May 21, 2015, naming Bastiaan VAN DIJK of Belgium as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as cochlear implants convert a received sound into electrical stimulation. The electrical stimulation is applied to the auditory nerve in the cochlea, which results in the perception of the received sound.

Another type of hearing prosthesis uses an actuator to mechanically vibrate the ossicular chain, whereby an amplified signal can reach the cochlea. This type of hearing prosthesis can have utility for both conductive losses and sensorineural loss, depending on the level of hearing loss.

SUMMARY

In accordance with an exemplary embodiment, there is a hearing prosthesis, comprising an implantable microphone and a noise cancellation system, wherein the hearing prosthesis is configured to set at least one operational parameter of the noise cancellation system based on input from a microphone external to the recipient of the implantable microphone.

In accordance with another exemplary embodiment, there is a method, comprising developing first data based on ambient sound, captured externally to a recipient and controlling a noise cancellation system of an implantable sound capture system based at least in part on the first data.

In accordance with another exemplary embodiment, there is a system, comprising a noise cancellation sub-system configured to at least partially cancel a body conducted noise component from a first signal that is output of an implantable microphone, wherein the first signal includes the body conducted noise component and an ambient sound component, and the system is further configured to at least partial cancel the body conducted noise component using a first algorithm that is based on a second signal that temporally preceded the first signal, wherein the second signal is based on captured sound that is at least one of (i) completely free of body conducted noise or (ii) completely comprised of ambient sound.

BRIEF DESCRIPTION OF THE DRAWINGS

Embodiments of the present invention are described below with reference to the attached drawings, in which.

DETAILED DESCRIPTION

Figure 1:
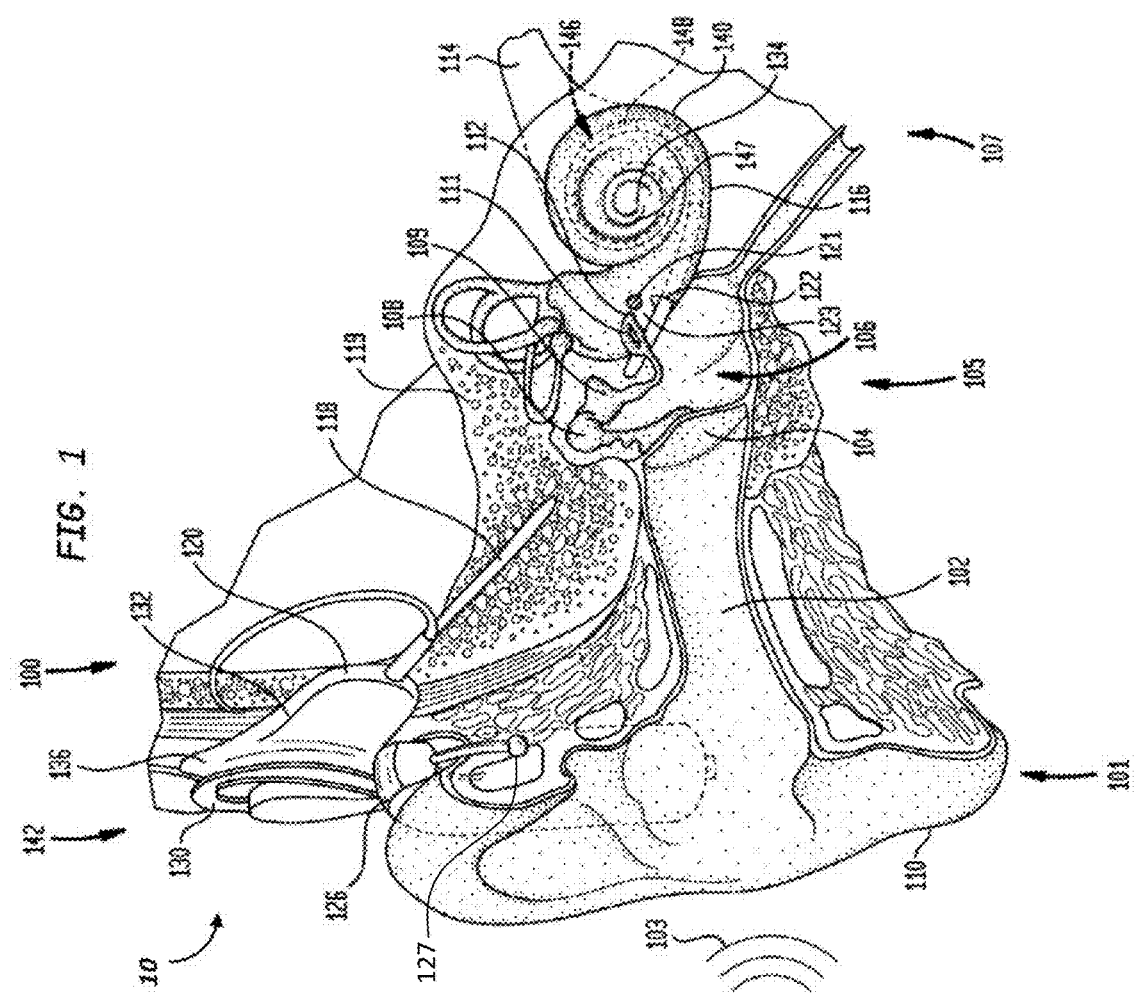
FIG. 1 is a perspective view of an exemplary hearing prosthesis in which at least some of the teachings detailed herein are applicable.

FIG. 1 is perspective view of a totally implantable cochlear implant, referred to as cochlear implant 100, implanted in a recipient, to which some embodiments detailed herein and/or variations thereof are applicable. The totally implantable cochlear implant 100 is part of a system 10 that can include external components, in some embodiments, as will be detailed below. It is noted that the teachings detailed herein are applicable, in at least some embodiments, to any type of hearing prosthesis having an implantable microphone.

It is noted that in alternate embodiments, the teachings detailed herein and/or variations thereof can be applicable to other types of hearing prostheses, such as, for example, bone conduction devices (e.g., active transcutaneous bone conduction devices), Direct Acoustic Cochlear Implant (DACI), etc. Embodiments can include any type of hearing prosthesis that can utilize the teachings detailed herein and/or variations thereof. It is further noted that in some embodiments, the teachings detailed herein and/or variations thereof can be utilized in other types of prostheses beyond hearing prostheses.

The recipient has an outer ear 101, a middle ear 105 and an inner ear 107. Components of outer ear 101, middle ear 105 and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109 and the stapes 111. Bones 108, 109 and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142. In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. Optionally, external device 142 includes a microphone 127 (sometimes referred to herein as an external microphone) that can be used as a supplement/alternate to the implantable microphone assembly as detailed below, although in other embodiments, the cochlear implant includes a stand-alone external microphone that is separate from the BTE device (the BTE device can also optionally include the microphone 127). Thus, the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement. Some additional details associated with the implantable microphone assembly 137 will be detailed below.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

As noted, cochlear implant 100 comprises a totally implantable prosthesis that is capable of operating, at least for a period of time, without the need for external device 142. Therefore, cochlear implant 100 further comprises a rechargeable power source (not shown) that stores power received from external device 142. The power source can comprise, for example, a rechargeable battery. During operation of cochlear implant 100, the power stored by the power source is distributed to the various other implanted components as needed. The power source may be located in main implantable component 120, or disposed in a separate implanted location.

It is noted that the teachings detailed herein and/or variations thereof can be utilized with a non-totally implantable prosthesis. That is, in an alternate embodiment of the cochlear implant 100, the cochlear implant 100 is a traditional hearing prosthesis.

In some exemplary embodiments, a signal sent to the stimulator of the cochlear implant can be derived from an external microphone, in which case the system is called a semi-implantable device, or from an implanted microphone, which then refers to a fully implantable device. DACIs can also use an implanted microphone, and thus are also fully implantable devices. Fully implantable devices can have utility by presenting improved cosmesis, having an improved immunity to certain noises (e.g., wind noise), presenting few opportunities for loss or damage, and can at least sometimes be more resistant to clogging by debris or water, etc. DACIs can have utilitarian value by keeping the ear canal open, which can reduce the possibility of infection of the ear canal, which otherwise is humid, often impacted with cerumen (earwax), and irritated by the required tight fit of a non-implanted hearing aid.

Implanted microphones can detect pressure. In at least some embodiments, they are configured to detect air pressure which is subsequently transmitted through the tissue to the microphone. Implanted microphones can detect other pressures presented to their surface, which can be undesirable in certain circumstances. One type of pressure which can represent an impairment to the performance of an implanted microphone is pressure due to acceleration. In some embodiments, such acceleration can have a deleterious effect on a hearing prosthesis if it is in the desired operational frequency range of the prosthesis, typically 20 Hz to 20 kHz, 20 Hz to 10 kHz or 20 Hz to 8 kHz, although narrower ranges still give satisfactory speech intelligibility. Accelerations may arise from, for example, foot impact during walking, motion of soft tissue relative harder tissues, wear of harder tissues against each other, chewing, and vocalization. In the case of a DACI, the acceleration can be caused by the actuator driving the ossicles.

In some embodiments, the accelerations induce pressure on the microphone, which cannot distinguish the desired pressure due to external sounds from the largely undesired pressure due to internal vibration originating directly from the body, or borne to the microphone through the body from an implanted actuator. The accelerations can be thought of as giving rise to these pressures by virtue of the microphone being driven into the tissue. If the microphone is securely mounted on the skull, and the skull vibrates normal to its surface, the microphone diaphragm will be driven into the tissue which, due to the mass, and hence inertia of the tissue, can present a reactive force to the microphone. That reactive force divided by the area of the microphone is the pressure generated by acceleration. The formula for acceleration pressure can be:

$$\Delta P = \rho \cdot t \cdot a$$

where $\Delta P$ is the instantaneous pressure above $P_0$, the ambient pressure, $\rho$ is the mean density of tissue over the microphone, t is the mean thickness of tissue over the microphone, and a is the instantaneous acceleration. When the acceleration is normal, but into the surface rather than away from the surface, a decrease in pressure is generated, rather than an increase.

In some instances, there can be utilitarian value to reducing signal outputs due to acceleration. Because the relative body-borne to air-borne pressure of an implanted microphone is typically 10-20 dB higher than what occurs in normal hearing, body originating sounds can be louder relative to externally originating sound. Such large ratios of vibration to acoustic signals are experienced by a recipient as banging and crashing during movement, very noisy chewing, and their own voice being abnormally loud relative to other speakers. At the same time, it should be noted that there is utilitarian value in avoiding the cancellation of all or part of the recipient's own voice. Complete cancellation of the recipient's own voice can result in, in some embodiments, the recipient speaking very loudly compared to other speakers. It is therefore utilitarian to reduce the ratio of vibration to acoustic signals to a level, such as a comparable level, to that found in normal hearing. In some embodiments, this can be achieved by an effective reduction of the acceleration pressure/air-borne pressure sensitivity of 10-20 dB. By doing so, a ratio of acoustic signal to vibration signal similar to what is experienced in normal hearing, and hence a more natural listening experience, can be achieved.

Additionally, signal borne by the body from an actuator as in a DACI can be amplified by the signal processing of the implant, and can present a gain of greater than 1 at some frequency around the loop formed by the microphone, signal processing, actuator, and tissue. This can be the case when dealing with high gains, such as may be the case with moderate to large hearing loss. Under such circumstances, unless additional steps are taken, such as are disclosed herein, the hearing prosthetic system can undergo positive feedback at some frequency and begin "singing," or oscillating. This oscillation can reduce the speech intelligibility, effectively masking out at least the frequency at which oscillation is occurring at, and often other frequencies through a psychoacoustic phenomenon called spread of masking. It can be annoying for the recipient, because the oscillation can occur at a very loud level, and increases the load on the battery, shortening required time between changing or charging batteries. This can require a much greater reduction in feedback of 25-55 dB (often 35-45 dB), and can depend upon the hearing loss of the recipient, as the more hearing loss of the recipient, the more gain will need to be given in the signal processing, at least in some instances. It can therefore be seen that a fully implantable DACI can need more attenuation to reduce (including eliminate) feedback to balance air to bone conducted sound level differences, such as might be needed in a fully implantable cochlear implant.

An exemplary embodiment that includes an implantable microphone assembly utilizes a motion sensor to reduce the effects of noise, including mechanical feedback and biological noise, in an output response of the implantable microphone assembly. In an exemplary embodiment, the diaphragm of the implantable microphone assembly that vibrates as a result of waves traveling through the skin of the recipient originating from an ambient sound, can be also affected by body noise and the like. To actively address non-ambient noise sources (e.g., body noise conducted through tissue of a recipient to a microphone, which in at least some embodiments is not of an energy level and/or frequency to be audible at a location away from the recipient, at least not without sound enhancement devices) of vibration of the diaphragm of the implantable microphone and thus the resulting undesired movement between the diaphragm and overlying tissue, some embodiments utilize a motion sensor to provide an output response proportional to the vibrational movement experienced by the microphone assembly. Generally, the motion sensor can be mounted anywhere such that it enables the provision of a sufficiently accurate representation of the vibration received by the implantable microphone in general, and the diaphragm of the implantable microphone, in particular. The motion sensor can be part of the assembly that contains the microphone/diaphragm thereof, while in an alternate embodiment it can be located in a separate assembly (e.g., a separate housing etc.). In an exemplary embodiment, the motion sensor is substantially isolated from the receipt of the ambient acoustic signals originating from an ambient sound that pass transcutaneously through the tissue over the microphone/diaphragm of the microphone and which are received by the microphone diaphragm. In this regard, the motion sensor can provide an output response/signal that is indicative of motion (e.g., caused by vibration and/or acceleration), whereas a transducer of the microphone can generate an output response/signal that is indicative of both transcutaneously received acoustic sound and motion. Accordingly, the output response of the motion sensor can be removed from the output response of the microphone to reduce the effects of motion on the implanted hearing system.

Figure 2:
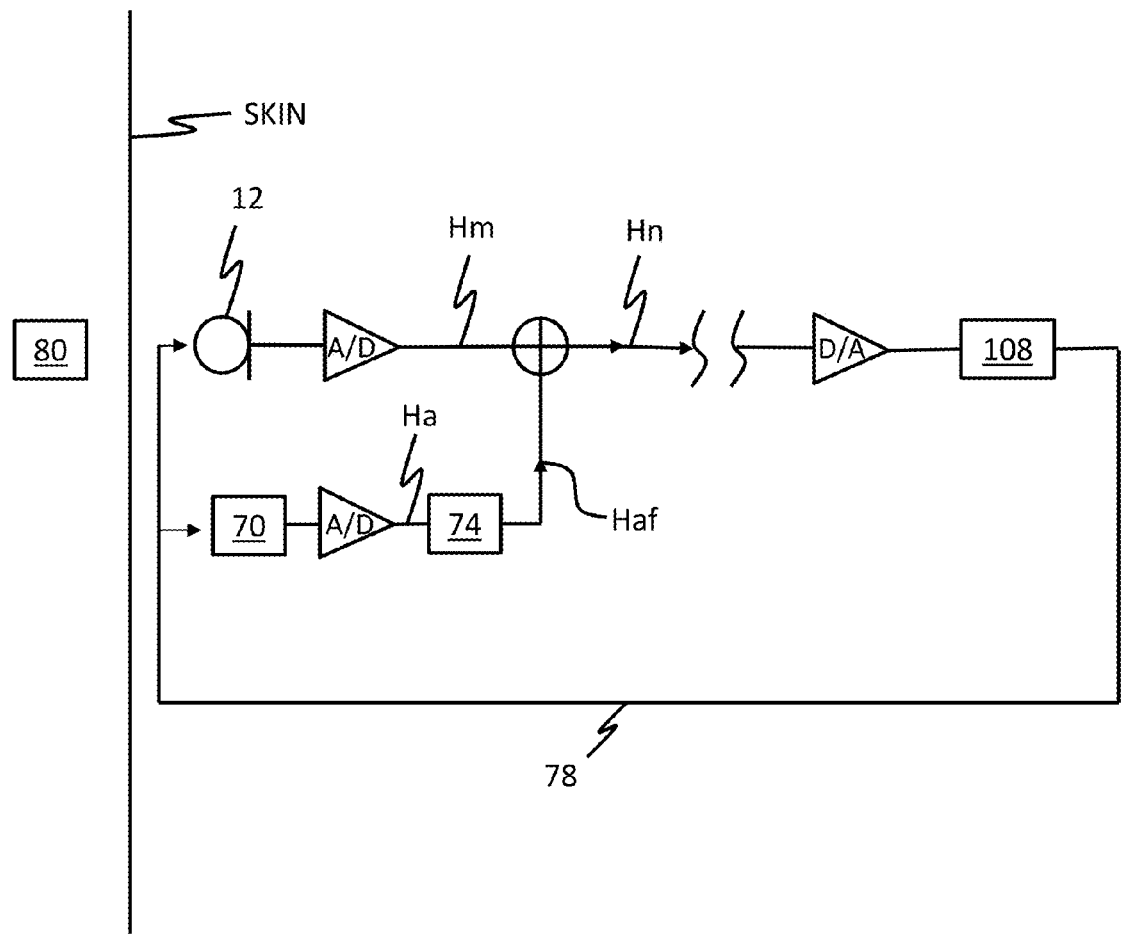
FIG. 2 schematically illustrates an implantable hearing system that incorporates an implantable microphone assembly and motion sensor 70.

Accordingly, to remove noise, including feedback and biological noise, it is utilitarian to measure the acceleration of the microphone assembly. FIG. 2 schematically illustrates an implantable hearing system that incorporates an implantable microphone assembly having a microphone 12 including a diaphragm and motion sensor 70. As shown, the motion sensor 70 further includes a filter 74 that is utilized for matching the output response Ha of the motion sensor 70 to the output response Hm of the microphone 12. Of note, the diaphragm of microphone 12 is subject to desired acoustic signals (i.e., from an ambient source 103), as well as undesired signals from biological sources (e.g., vibration caused by talking, chewing, etc.) and, depending on the type of output device 108 (e.g., bone conduction vibratory apparatus, DACI actuator, and in some instances, cochlear implant electrode array) feedback from the output device 108 received by a tissue feedback loop 78. In contrast, the motion sensor 70 is substantially isolated (which includes totally isolated) from the ambient source and is subjected to only the undesired signals caused by the biological source and/or by feedback received via the feedback loop 78. Accordingly, the output of the motion sensor 70 corresponds the undesired signal components of the microphone 12. However, the magnitude of the output channels (i.e., the output response Hm of the microphone 12 and output response Ha of the motion sensor 70) can be different and/or shifted in phase and/or have a shifted frequency response. In order to remove the undesired signal components from the microphone output response Hm, the filter 74 and/or the system processor can be operative to filter one or both of the responses to provide scaling, phase shifting and/or frequency shaping. The output responses Hm and Ha of the microphone 12 and motion sensor 70 are then combined by summation unit 76, which generates a net output response Hn that has a reduced response to the undesired signals, at least if the filter 74 has the correct response.

In order to implement a filter 74 for scaling and/or phase shifting the output response Ha of a motion sensor 70 to remove the effects of feedback and/or biological noise from a microphone output response Hm, a system model of the relationship between the output responses of the microphone 12 and motion sensor 70 is identified/developed. That is, the filter 74 can be operative to manipulate the output response Ha of the motion sensor 70 to biological noise and/or feedback, to replicate the output response Hm of the microphone 12 to the same biological noise and/or feedback. In this regard, the filtered output response Haf and Hm may be of substantially the same magnitude and phase prior to combination (e.g., subtraction/cancellation). However, it will be noted that such a filter 74 need not manipulate the output response Ha of the motion sensor 70 to match the microphone output response Hm for all operating conditions. Rather, the filter 74 can match the output responses Ha and Hm over a predetermined set of operating conditions including, for example, a desired frequency range (e.g., an acoustic hearing range) and/or one or more pass bands. Note also that the filter 74 can accommodate the ratio of microphone output response Hm to the motion sensor output response Ha to acceleration, and thus any changes of the feedback path which leave the ratio of the responses to acceleration unaltered have little or no impact on good cancellation. Such an arrangement thus can have significantly reduced sensitivity to the posture, clenching of teeth, etc., of the recipient.

Figure 3A:
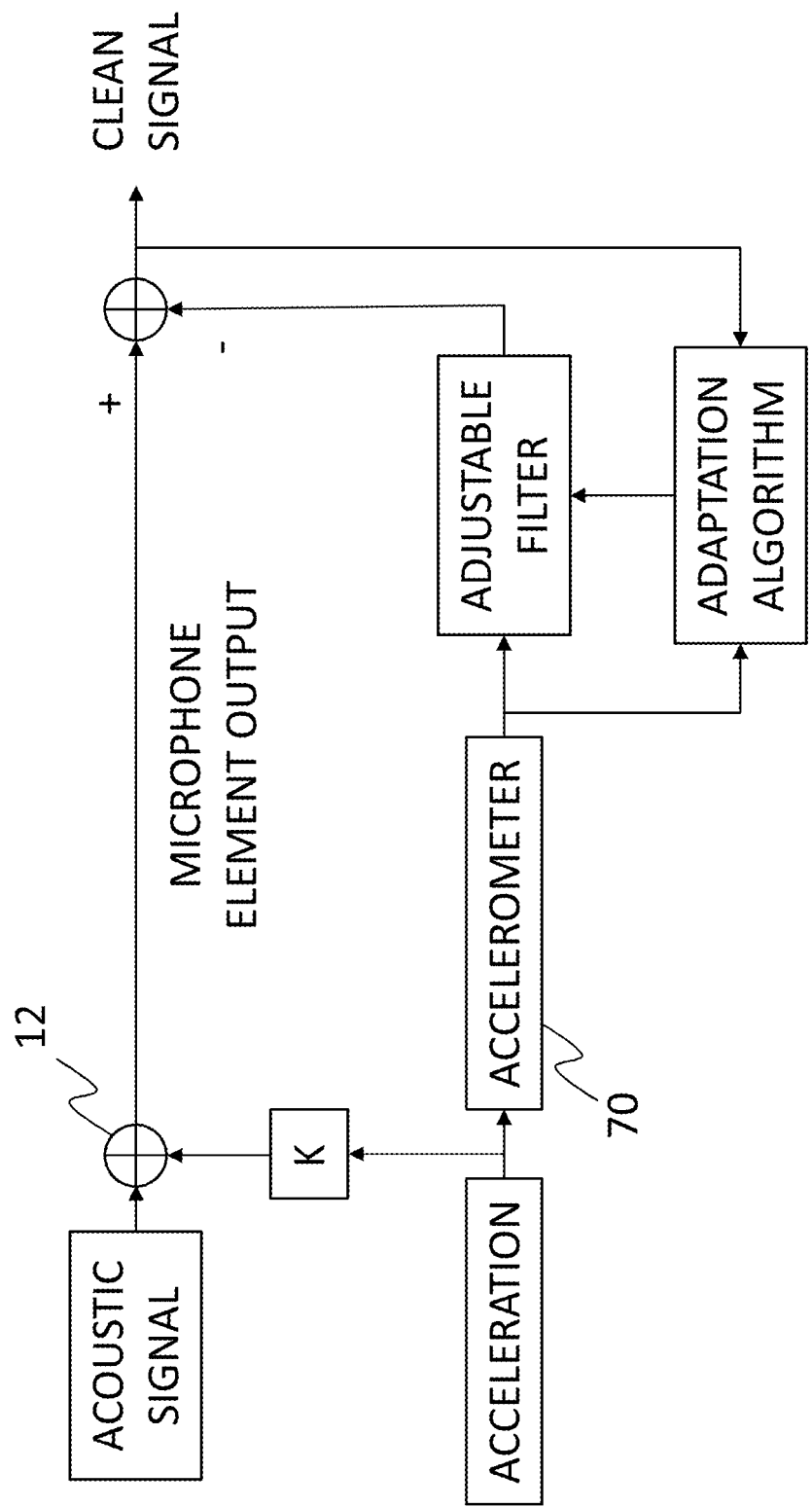
FIG. 3A functionally illustrates an exemplary use of adaptive filters.

An exemplary embodiment utilizes adjustable filters, such as, by way of example only and not by way of limitation, adaptive filter(s), to filter out body noise and the like. More particularly, FIG. 3A functionally illustrates an exemplary use of such adaptive filters. (It is noted that other embodiments can be implemented using adjustable filters that are not adaptive filters. Any filter arrangement that can enable the teachings detailed herein and/or variations thereof to be practiced can be utilized in at least some embodiments.) In FIG. 3A, biological noise is modeled by the acceleration at the microphone assembly filtered through a linear process K. This signal is added to the acoustic signal at the surface of the microphone element. In this regard, the microphone 12 sums the signals. If the combination of K and the acceleration are known, the combination of the accelerometer output and the adaptive/adjustable filter can be adjusted to be K. This is then subtracted out of the microphone output at point. This will result in the cleansed or net audio signal with a reduced biological noise component. This net signal may then be passed to the signal processor where it can be processed by the hearing system.

Figure 3B:
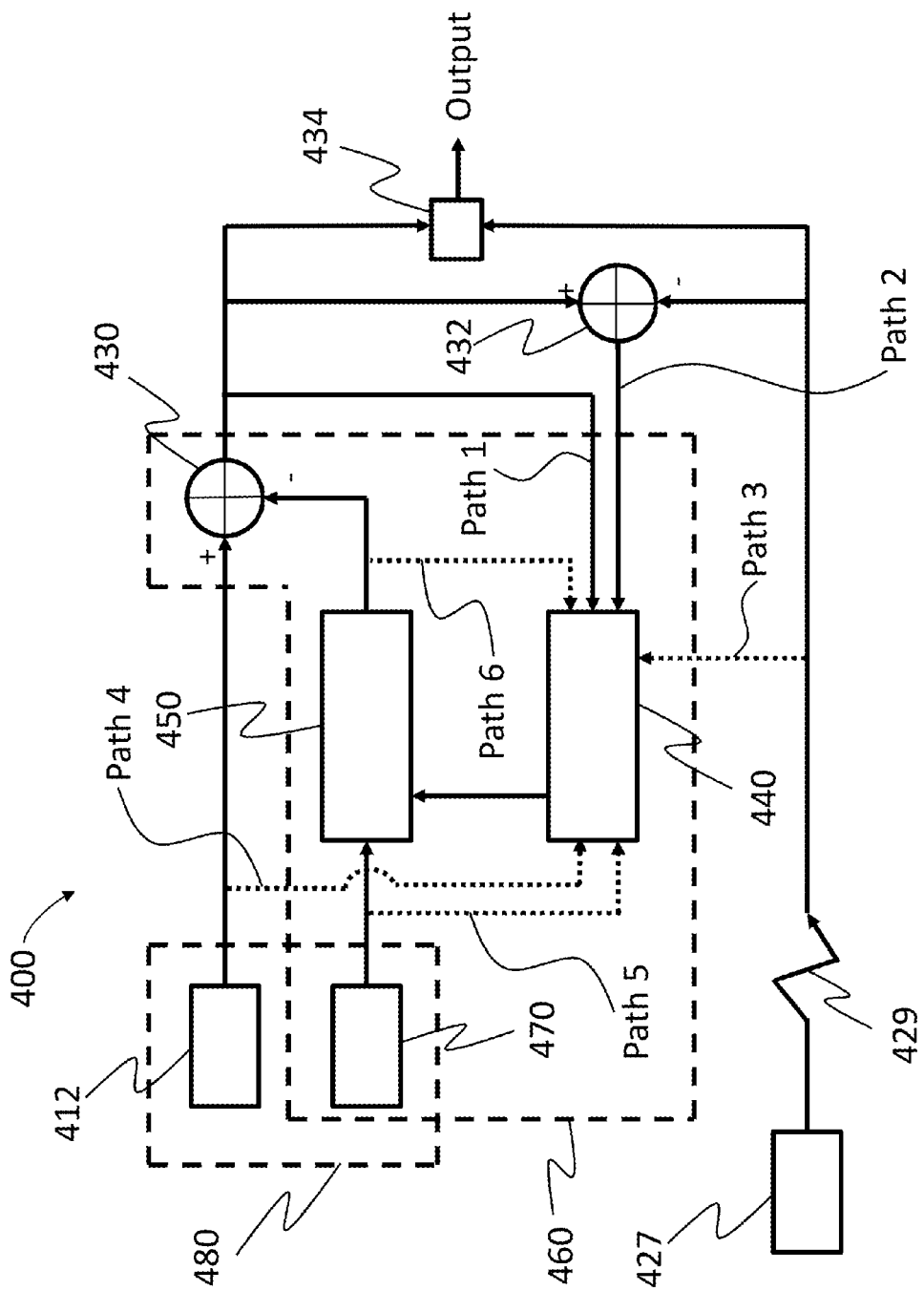
FIG. 3B functionally depicts an exemplary embodiment of a system that is usable in the hearing prosthesis of FIG. 1 that functionally operates in accordance with the schematic of FIG. 3A.

FIG. 3B functionally depicts an exemplary embodiment of a system 400 that is usable in the hearing prosthesis 10 of FIG. 1 that functionally operates in accordance with the schematic of FIG. 3A, along with additional functionality as will be detailed below. As can be seen, the system 400 includes microphone 412 and accelerometer 470. The microphone 412 is configured such that it receives signals resulting from the ambient sound, as well as biological noise/body noise, including, in at least some embodiments, signals resulting from a recipient's own voice that travels through the body via bone conduction/tissue conduction. These latter signals are added at the microphone 412 to the signals resulting from ambient sound because the microphone 412 detects both signals. Conversely, accelerometer 470 is ideally functionally isolated from the signals resulting from the ambient sound, and generally only responds to body noise signals and/or feedback signals. The system 400 incorporates an adaptive filter apparatus 450 controlled by a control unit 440 that runs an adaptive algorithm to control the filter(s) of the adjustable filter apparatus 450. Details of the adaptive algorithm are provided below, but briefly, as can be seen, the output of the adaptive filter apparatus 450, controlled by filter control unit 440, is fed to adder 430, wherein it is added to (or, more accurately, subtracted from) the output of the microphone 412, and optionally passed on, depending on the positioning of switch 434 (which functionally represents controlling the system to be in implanted microphone mode or external microphone mode, as described in greater detail below), to a signal processor and/or an output device (not shown, but, for example, a receiver stimulator of a cochlear implant, an actuator of a DACI, and/or an actuator (vibrator) of an active transcutaneous bone conduction device) of the hearing prosthesis system 400. Collectively, the accelerometer 470, the adjustable filters 450, the filter control unit 440, and the adder 430 correspond to an adaptive noise cancellation sub-system 460. Control unit 440 runs the adaptive algorithm to control the filter(s) of the adjustable filter apparatus 450 based on, for example, at least in part, feedback of the signal outputted by the adder 430.

Adaptive filters can perform this process using the ambient signals of the acceleration, and the acoustic signal plus the filtered acceleration. The adaptive algorithm and adjustable filter can take on many forms, such as continuous, discrete, finite impulse response (FIR), infinite impulse response (IIR), lattice, systolic arrays, etc. Some exemplary algorithms for the adaptation algorithm include stochastic gradient-based algorithms such as the least-mean-squares (LMS) and recursive algorithms such as RLS. Alternatively, and/or in addition to this, algorithms which are numerically more stable can be utilized in some alternate embodiments, such as the QR decomposition with RLS (QRD-RLS), and fast implementations somewhat analogous to the FFT. The adaptive filter can incorporate an observer, that is, a module to determine one or more intended states of the microphone/motion sensor system. The observer can use one or more observed state(s)/variable(s) to determine proper or utilitarian filter coefficients. Converting the observations of the observer to filter coefficients can be performed by a function, look up table, etc. In some exemplary embodiments, adaptation algorithms can be written to operate largely in the digital signal processor "background," freeing needed resources for real-time signal processing.

Still referring to FIG. 3B, as can be seen, the system 400 includes a microphone 427 that, in at least some exemplary embodiments, corresponds to the external microphone 127 of FIG. 1 detailed above. That is, in an exemplary embodiment, microphone 427 can be a part of the BTE device 126, and sound captured by the microphone 427 can be transduced by the microphone to a signal representative of the captured sound and then transcutaneous transmitted to the implantable component of the hearing prosthesis (as represented by wireless link symbol 429 in FIG. 3B), where the signal is processed by the implantable component for subsequent use to evoke a hearing percept according the teachings detailed herein. That said, in an alternative embodiment, microphone 427 can correspond to a remote microphone that is separate from the BTE device 126. By way of example only and not by way of limitation, microphone 427 can be a microphone that is placed on a table or the like and wirelessly (or in a wired manner) transmits signals to the BTE device (or another device that is in communication with the implantable component) such that the signals are transcutaneous transmitted to the implantable component. Still further, in an exemplary embodiment, there can be two or more wireless links between microphone 427 and the output of the system 400 to account for multiple microphones. Any device, system and/or method of implementing an external microphone into the system 400 that will enable the teachings detailed herein and/or variations thereof to be practiced can be utilized in at least some embodiments.

As seen in FIG. 3B, switch 434 controls the output from the microphone 427 to the signal processor and/or the output device (not shown, but, for example, a receiver stimulator of a cochlear implant, an actuator of a DACI, and/or an actuator (vibrator) of an active transcutaneous bone conduction device) of the hearing prosthesis system 400. That is, in an exemplary embodiment, the hearing percept evoked by the system 400 can be variously respectively based on the implantable microphone 412 or the external microphone 427. In this regard, a hearing percept can be evoked that is, in at least in some embodiments, based on sound that is effectively isolated (which includes isolated) from the body conducted noise by using the external microphone 427 as opposed to the implantable microphone 412. Thus, in an exemplary embodiment, switch 434 enables system 400 provide the recipient the ability to switch between the convenience of utilizing an implantable microphone 412 without an external microphone, thus enabling the system 400 to function as a totally implantable hearing prosthesis, and obtaining hearing percepts based on captured sound that is less affected by body conducted noise and/or naturally effectively isolated from body conducted noise (as opposed to the sound captured by the implantable microphone 412). In this regard, in at least some embodiments, switch 434 respectively (i) blocks output from the adaptive noise cancellation sub-system 460 while passing output from the external microphone 427 (or, more accurately, passing signals based on the output from the external microphone 427) and (ii) blocks output from the external microphone 427 (if present) while passing output from the adaptive noise cancellation sub-system 460.

Still referring to FIG. 3B, it can be seen that the system 400 includes two different feedback paths from adder 430 to the filter control unit 440. The first path, path 1, is a path that inputs an unmodified signal from the adder 430 back into the control unit 440. In this regard, in an exemplary embodiment, filter control unit 440 controls the filters based solely on the output from the adder 430 or based solely on the output from the adder 430 and the other inputs into the filter control unit 440 as may be utilitarian that enable the adaptive noise cancellation sub-system 460 to operate. Control unit 440 runs the adaptive algorithm to control the filter(s) of the adjustable filter apparatus 450 based on, for example, at least in part, feedback of the signal outputted by the adder 430.

The second path (path 2), is a path that also extends from adder 430 to control unit 440, but also includes adder 432. Via path 2, output from the adaptive noise cancellation sub-system from adder 430 is added to (or, more accurately, subtracted from) the output from the external microphone 427, and passed on to control unit 440. It is briefly noted that in the absence of a signal from the external microphone, or in the presence of a blockage of the signal from the microphone (which could correspond to, for example, an embodiment where a switch is located in between the adder 432 and the link 429 which prevents output from the microphone 427 from reaching the outer 432), the signal fed into the filter control unit 440 is the signal from the adder 430, and thus identical to the signal of path 1. Conversely, in an ideally working system, without any energy from ambient noise affecting the accelerometer 470, the output of adder 432, and thus the input from path 2, should be zero, and there would be no transfer function differences between the microphone 412 and the accelerometer 470 over time.

It is noted that while the embodiment of FIG. 3B includes 2 paths, in at least some embodiments, the embodiment of FIG. 3B utilizes only a single path (path 2). Conversely, as will be detailed below, in alternative embodiment, additional paths are present.

While at least some embodiments are such that the filter control unit 440 controls the adjustable filters 450 based on the signal from path 1, in at least some embodiments, the adjustable filters 450 are not necessarily directly controlled by filter control unit 440 when the adder 432 is adding the signals from the adder 430 and the microphone 427. Instead, as will be explained in greater detail below, in an exemplary embodiment, the adaptive noise cancellation sub-system 460 functions as a system that develops data to adjust or otherwise control the filters 450 at a later time via a learning process based on the comparison of the output of the adder 430 and the microphone 427 (although such may include controlling the adjustable filters 450 by filter control unit 440). Also as will be presented in greater detail below, in an alternate embodiment, the adaptive noise cancellation sub-system 460 develops data to adjust or otherwise control the filters 450 at a later time via a learning process based on the comparisons of the output of the microphone 412, the accelerometer 470 and the microphone 427.

More particularly, an exemplary embodiment includes a hearing prosthesis, such as the hearing prosthesis 10 of FIG. 1 including the system 400 of FIG. 3B, that includes an implantable microphone, such as implantable microphone 412, and a noise cancellation system, such as by way of example only and not by way of limitation, the adaptive noise cancellation sub-system 460 (although in other embodiments, it is noted that the noise cancellation system need not be an adaptive noise cancellation system—any adjustable noise cancellation system can be utilized in at least some embodiments). In this exemplary embodiment, the hearing prosthesis is configured to set an operational parameter of the noise cancellation sub-system based on input from a microphone external to the recipient (e.g., microphone 427) of the implantable microphone. By way of example, such input is provided by path 2, which corresponds to the output of the adder 430 added to output of the external microphone 427, and thus the signal provided to control unit 440 is based on input from the external microphone 427 (it is also based on input from the implantable microphone 412—as will be detailed below, in an alternate embodiment, a signal path is provided that bypasses the adder 432, and thus a path exists that is totally based on input from the external microphone 427). In an exemplary embodiment of this exemplary embodiment, the operational parameter is a parameter related to the control of the filters 450 of the adaptive noise cancellation sub-system 460.

More particularly, during normal operation of the hearing prosthesis system 400 (e.g., relying totally on the output from the transducer system 480 to evoke a hearing percept), the filter control unit 440 bases the control of the filters 450 on input from path 1 (or from input from path 2 where no input is provided from the microphone 427 (either due to the fact that the microphone is not transmitting, or due to the fact that a switch prevents signal communication between link 429 and adder 432), and the output from switch 434 outputs a signal that is identical to that of path 1, which is directed to an output device of the hearing prosthesis (e.g., a stimulator of a cochlear implant array, an actuator of an active transcutaneous bone conduction device, etc., although it is noted that a sound processor may be located in between switch 434 and the output component, depending on the embodiment). That is, the evoked hearing percept evoked by the hearing prosthesis system 400 is based on the output of the implantable microphone 412, as adjusted at adder 430 by the signal output from the filters 450, which signal is based on output from implantable accelerometer 470.

During this normal operation (implantable microphone-based operation), the output signal from the microphone 412 contains a component corresponding to ambient sound of the recipient that impinges upon the skin of the recipient and is transferred to the microphone through the tissue of the recipient. This is the desired signal component that enables the recipient of the hearing prosthesis system 400 to hear ambient sound (e.g., a person speaking to the recipient). Also during this normal operation, the output signal from the microphone 412 additionally contains a component corresponding to noises that originate from within the recipient and/or conducted by the tissue of the recipient directly to the microphone 412 (i.e., without passing through the ambient air). Hereinafter, these noises are referred to as "body conducted noise" for linguistic convenience. This signal component is generally considered undesirable noise, and in an exemplary embodiment, the noise cancellation sub-system cancels at least a portion of this noise.

That is, during normal operation of the hearing prosthesis system 400, coupled with normal operation of the adaptive noise cancellation sub-system 460, output from the accelerometer 470, which ideally has no component based on the ambient sound originating from outside the recipient, as filtered by filters 450 (e.g., in an adaptive matter), is subtracted from the output of the microphone 412 at adder 430. This resulting signal (corresponding to signal path 1) ideally has no residual body conducted noise component. That is, if the accelerometer 470 were operating at maximum efficiency and the input into the accelerometer corresponded exactly to the body conducted noise component that is input into the microphone 412, the output of the adder 430 would not include any body conducted noise portion (because it would then subtracted out). Alas, in at least some scenarios, at least sometimes, if not always, an ambient sound component is captured by the accelerometer 470. That is, in at least some embodiments, or in at least some implementations of some embodiments, of the hearing prosthesis system 400, the accelerometer 470 cannot be completely isolated from the energy resulting from ambient sound. Alternatively and/or in addition to this, the body conducted noise captured by the accelerometer 470, or otherwise the output of the accelerometer 470, does not correspond exactly to the body conducted noise that is captured by the implanted microphone 412, or otherwise the component of the body conducted noise outputted by the microphone 412 does not correspond perfectly to the output of the accelerometer 470, because of imperfect isolation of the components. This is a static imperfection in that the imperfection does not meaningfully change, at least during limited temporal periods. Still further, in some exemplary embodiments, there can be dynamic imperfections, which can include, for example, a shift in the transfer function between the microphone 412 and the accelerometer 470 over time (including a limited temporal periods lasting five or fewer seconds, such as can occur when the skin over the implanted microphone tensions as a result of the recipient turning his or her head) from that which was initially the case (e.g., the frequency response can shift, a phase shift can occur, etc.).

Hereinafter, these imperfections (static and dynamic) are generically referred to as imperfections of the transducer system 480. Accordingly, the output to the switch 434, and thus the hearing percept evoked by the hearing prosthesis system 400, will be distorted relative to that which would be the ideal case or the case in a scenario where there was no body noise component in the output of the microphone 412/no body noise energy impinging upon the transducer system 480 (and thus no output from the accelerometer 470) and/or relative to a stable transfer function regime between the microphone 412 and the accelerometer 470, albeit much less distorted relative to that which would be the case without the noise cancellation sub-system 460. By analogy, this distortion can be considered an "error" coefficient, and will be referred to as such herein in terms of "error." By using the output of the microphone 427, which should be isolated from body conducted noise owing to the geographical fact that it can be located completely away from the recipient (e.g., tens of centimeters, or a meter or more from the recipient), or at least less affected by body conducted noise, data can be obtained from the microphone 427 to which can be compared the product of the noise cancellation sub-system 460. The results of this comparison can be utilized to identify the error that results from the aforementioned "imperfections" (generically speaking) of the noise cancellation sub-system 460/the imperfections (again, generally speaking) of the transducer system 480, and thus train the noise cancellation sub-system 460 to account for the above noted distortion that exists due to the imperfections with respect to isolation of the accelerometer 470, the differences in the transfer function between the accelerometer 470 and the microphone 412, etc.

In an exemplary embodiment, the hearing prosthesis system 400 is configured such that a recipient can switch from an evoked hearing percept that is based on output from the implantable microphone 412 evoked hearing percept that is based on output from the external microphone 427, and vice versa. In general terms, the hearing prosthesis system 400 is configured to provide utilitarian value in that the recipient can have the benefits of a totally implantable hearing prosthesis system (or at least the benefits of a hearing prosthesis system in which the microphones are implanted) as well as the benefits of a hearing prosthesis system where the microphones or other sound capture device is located outside the recipient. By way of example only and not by way of limitation, the hearing prosthesis system 400 can be configured to enable the recipient to provide input into the hearing prosthesis to switch between the two modes of operation. Alternatively, and/or in addition to this, the hearing prosthesis system 400 can be configured to automatically switch between the two modes based on the origination of the input. Any device, system, and/or method that can enable the hearing prosthesis system 400 to switch between the two modes in a utilitarian manner can utilize in at least some embodiments.

During at least some scenarios when the hearing prosthesis is in the external microphone-based mode (e.g. the hearing percept is evoked based on output of the external microphone 427), the noise cancellation sub-system 460 is inactive, because the output from the implanted microphone 412 is not being used. That is, the hearing percept evoked by the hearing prosthesis system 400 can be evoked completely based on the sound captured by the external microphone 427. Indeed, in at least some situations, such a hearing percept can be subjectively better as compared to the hearing percept evoked based on output of microphone 412, all other things being equal (e.g., the sound captured by the implantable microphone is the sound captured by the microphone external to the recipient originates from the same source at the same time—it is the same sound).

In an exemplary embodiment of the hearing prosthesis system 400, even though the hearing percept evoked by the hearing prosthesis system 400 is not based on the output of implantable microphone 412, the noise cancellation sub-system 460 remains active. More specifically, the noise cancellation sub-system 460 functions as it normally would as if the output thereof was being utilized to evoke a hearing percept. Indeed, in at least some embodiments, the only difference between this mode (hereinafter the data collection mode) and the implantable microphone-based mode is that the switch 434 is configured to block the output from the noise cancellation sub-system from being output to an output device of the hearing prosthesis. Accordingly, the data collection mode corresponds to a mode in which the hearing prosthesis operates in the external microphone-based mode with the noise cancellation sub-system 460 in operation.

Thus, in an exemplary embodiment, the noise cancellation system is configured to compare data that is at least in part based on an output signal of the implantable microphone (again, microphone 412 for example, corresponding to, for example data of path 1) that is indicative of sound captured by that implantable microphone to data that is based at least in part on the input from the microphone external to the recipient (again, microphone 427 for example, corresponding to, for example data of path 2, or data of path 3, as will be described below), wherein the input from the microphone external to the recipient is based on sound captured by the microphone external to the recipient. The setting of the operational parameter of the noise cancellation system (e.g., a parameter related to the control of the filters 450 of the adaptive noise cancellation sub-system 460) is based on the comparison of data based on the output signal of the implantable microphone (e.g., microphone 412) to data based on the input from the microphone external to the recipient (e.g., microphone 427). That is, in an exemplary embodiment of the data collection mode, filter control unit 440 evaluates the signal from path 2 (where the sound captured by the implantable microphone 412 and the sound captured by the microphone 427 originates from a same source at a same time), and based on this evaluation, the filter control unit 440 develops an adjustment to the algorithm/adjusts the algorithm that it utilizes to control the filters 450. This adjusted algorithm is later used when the hearing prosthesis system 400 is in the implantable microphone-based mode, with the output of the adder 430 being more closely corresponding to the signal that would exist at the switch 434 when the hearing prosthesis system 400 is in the external microphone-based mode. That is, the adjustment to the algorithm that is utilized by the filter control unit 440 at least in part accounts for the above noted discrepancies that can arise due to incomplete isolation of the accelerometer 470 from ambient noise and or a difference in the body conducted noise received at the accelerometer 470 and that received by the implantable microphone 412 and/or the aforementioned transfer function shifts. Moreover, in at least some embodiments, the adjustment of the algorithm can further accounts at least in part for any other discrepancies that can result from the utilization of the implanted transducer system 480 to evoke a hearing percept relative to the utilization of the external microphone 427 to evoke a hearing percept.

By evaluating the input from path 2, where, for example, input from path 2 can be considered to correspond to the "error" in the system, the hearing prosthesis can train the noise cancellation sub-system 460 (including the noise cancellation sub-system training itself) to cancel noise based on input from the implantable microphone that is based on sound captured by the implantable microphone 412 and input from the microphone 427 based on sound captured by the microphone 427. Any device, system, and/or method that can enable the hearing prosthesis system 400 to train itself can be utilized in at least some embodiments. Note further, in at least some embodiments, the hearing prosthesis system 400 need not be configured to train itself. Instead, in some embodiments, the hearing prosthesis system 400 can collect temporally linked data or other data linked in a sufficient manner corresponding to the output of path 2 (or other paths as disclosed herein). This data can be uploaded to a standalone device where the comparison between the data can be made, and an adjustment to the algorithm/new algorithm for the filter control unit 440 can be developed based on this comparison. Any device, system, and/or method that can enable the algorithm of the filter control unit 440 to be adjusted or otherwise modified based on the data of path 2 (or other data paths) so as to compensate for the above noted discrepancies between the external microphone-based mode in the implanted microphone-based mode can be utilized in at least some embodiments.

Moreover, in an exemplary embodiment, the noise cancellation sub-system 460 is configured to automatically identify filter coefficient settings of the adjustable filters 450, which, in some embodiments, can be adaptive filters) of the noise cancellation sub-system based on input from the implantable microphone 412 that is based on sound captured by the implantable microphone 412 and input from the microphone 427 external to the recipient based on sound captured by the microphone 427. In an exemplary body, the noise cancellation sub-system 460 is further configured to then implement these filter coefficient settings for use in noise cancellation when the hearing prosthesis system 400 is in the implantable microphone-based mode. That said, in an alternate embodiment, a standalone device can be utilized based on data collected by the hearing prosthesis system 400.

In an alternative embodiment, data that is based at least in part on input from the external microphone 427 can be obtained from a signal where the output from adder 430 is not subtracted therefrom. More particularly, FIG. 3B presents an alternate embodiment where a path 3 exists that leads to the control unit 440 that bypasses adder 432. In an exemplary embodiment utilizing path 3, a signal is obtained by the control unit 440 that is not influenced by the implanted transducer system 480. In an exemplary embodiment where path 3 exists, input from path 1 can be compared to the input of path 3. In this regard, the signal of path 1 and path 2 corresponds to data that is at least in part based on an output signal of the implantable microphone that is indicative of sound captured by the implantable microphone, and the signal of path 2 and path 3 corresponds data that is based at least in part on the input from the microphone external to the recipient.

Moreover, as can be seen from FIG. 3B, additional signal paths can be provided to the control unit 440. For example, signal path 4 corresponds to a signal path that represents the output of the implanted microphone 412 without modification relating to output of the accelerometer 470 (e.g., path 4 extends from the signal path between the output of the microphone 412 and the adder 430). Still further by example, signal path 5 corresponds to a signal path that represents the output of the accelerometer 470 without modification relating to output of the microphone 412 and modification resulting from filters 450 (e.g., path 5 extends from the signal path between the output of the accelerometer 470 and the filter 450, where the adder 430 is downstream of the filter 450). Signal path 6 corresponds to a signal path that represents the output of the accelerometer 470 without modification relating to output of the microphone 412 but with modification resulting from filters 450 (e.g., path 6 extends from the signal path between the output of the filter 450 and the adder 430, where the adder 430 is downstream of the filter 450). In an exemplary embodiment, the input of path 3 can be compared to the input of paths 4 and 5, the input of path 3 can be compared to the input of paths 4 and 6, etc.

Moreover, while exemplary embodiments presented in FIG. 3B show all paths leading to the control unit 440, an alternate embodiment, these paths need not lead to the control unit 440 (with the possible exception of path 1, which is used by the noise cancellation sub-system irrespective of the learning features detailed herein, and also possibly path 4, depending on some specific implementations of some embodiments). Indeed, by way of example only and not by way of limitation, at least some of the paths could instead or in addition lead to a memory unit or a processor separate from the control unit 440. For example, path 3 can lead to a memory unit that is located externally to the recipient. In an exemplary embodiment, the comparison can be made based on data obtained by path 3 that is sufficiently temporally linked in the memory unit or otherwise linkable to the data of one or more of the other paths, which data is also stored in a memory unit, such that the storage enables the comparison(s) and/or evaluation(s) detailed herein to be executed remote from the hearing prosthesis. Any comparison or evaluation of data based on any phenomenon from any source at any time that will enable the algorithm of the control unit 440 to be adjusted to account for the imperfections associated with the transducer system 480 can be utilized in at least some embodiments.

Figure 3C:
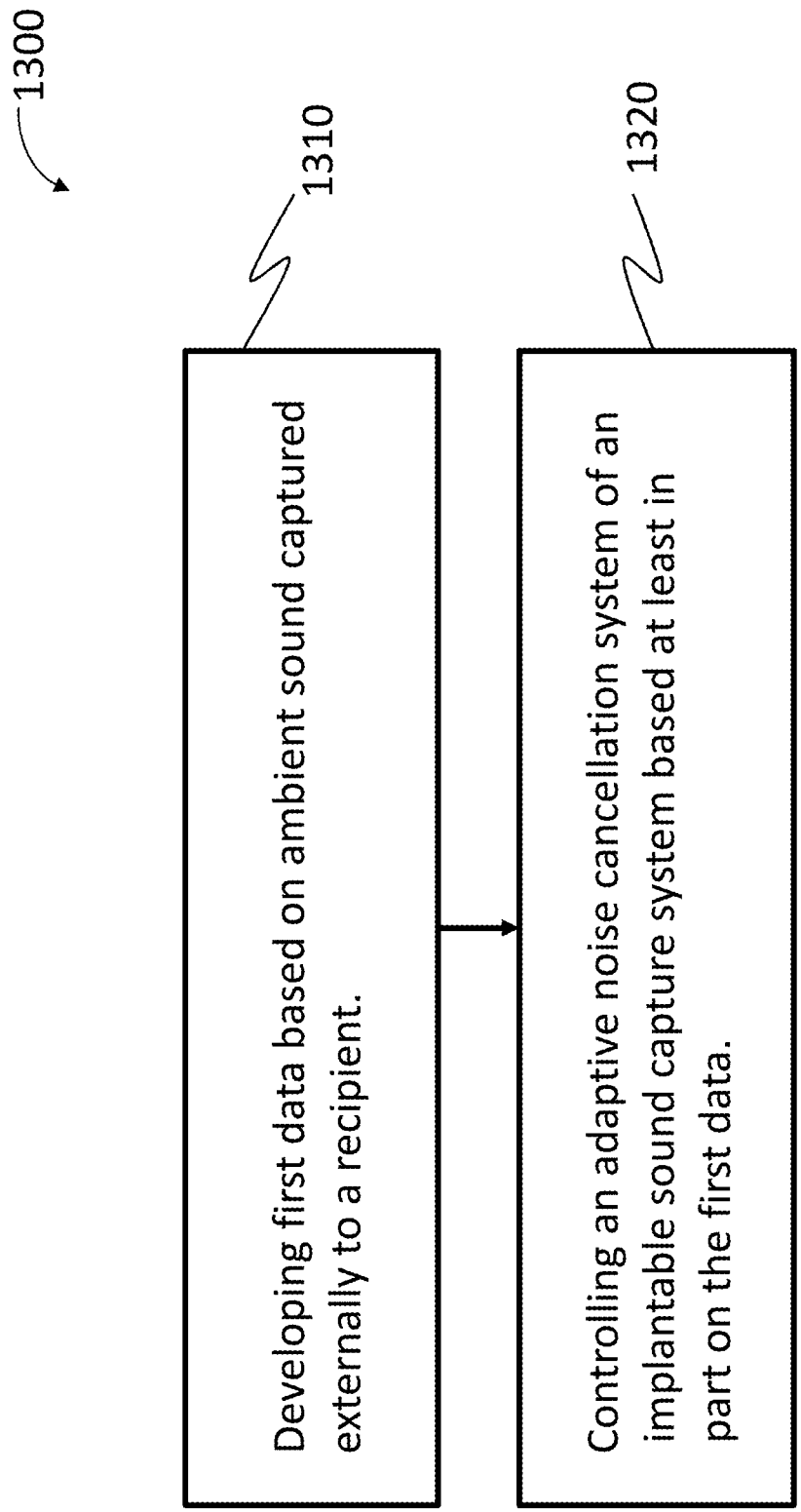
FIG. 3C depicts an exemplary flow chart according to an exemplary process.

In view of the above, an embodiment includes a method as represented by the flowchart of FIG. 3C. Particularly, FIG. 3C presents method 1300 that includes method action 1310, which entails developing first data based on ambient sound captured externally to a recipient. In this regard, in an exemplary embodiment, this first data can corresponds to data from path 2 or path 3. More specifically, in an exemplary embodiment, the first data can be developed by operating the hearing prosthesis system 400 in the external microphone-based mode. That said, in an alternative exemplary embodiment, the first data can be developed by operating the hearing prosthesis 400 in the implantable microphone-based mode, where the external microphone 427 is operating as a data collection device where the hearing percept evoked by the hearing prosthesis system 400 are based on the output of the implantable microphone 411 and not on the output of the external microphone 427. Still further, in at least some embodiments, the external microphone 427 need not be a device that is part of the hearing prosthesis system 400 or otherwise in communication with the hearing prosthesis system 400. Method action 1310 can be executed with any data based on ambient sound captured externally to a recipient from any source, at least providing that such can be sufficiently linked at a later time, temporally or otherwise, to other data (e.g., data relating to one or more of signal paths 1, 4, 5 or 6) such that the teachings detailed herein and or variations thereof with respect to developing an algorithm for the adaptive noise cancellation sub-system 460 that accounts for the above noted imperfections with respect to the transducer system 480/transfer function shifts detailed above.

The first data can be stored by the control unit 440, or any other component of the hearing prosthesis 400. Indeed, as noted above, in an alternative embodiment, the first data (e.g., data from path 3, data from path 2) can alternatively and/or in addition to this be transmitted from the external microphone 427 and/or from the hearing prosthesis 400 to an external storage device separate from the hearing prosthesis system 400 (e.g., in a manner concomitant with telemetry systems utilized with implanted medical devices). Any device, system and/or method of collecting the data can be utilized in practicing method action 1310.

Method 1300 further includes method action 1320, which entails controlling an adaptive noise cancellation system (e.g., sub-system 460) of an implantable sound capture system based at least in part on the first data. In this regard, by way of example only and not by way of limitation, because an algorithm developed as detailed above based on the evaluation of signal path 2 or the comparison of signal path 1 to signal path 3 (or one or more of the other signal paths) to accommodate for the imperfections/transfer function shifts associated with transducer system 480 is based on data that is based on ambient sound captured externally to a recipient, the operation of the adaptive noise cancellation sub-system 460 utilizing such a developed algorithm corresponds to executing method action 1320.

In view of the above, an exemplary embodiment includes a system, such as the hearing prosthesis system 400, comprising a noise cancellation sub-system (e.g., sub-system 460 of FIG. 3B) configured to at least partially cancel a body conducted noise component from a first signal that is output of an implantable microphone (e.g., microphone 412). In an exemplary embodiment, this first signal includes the aforementioned body conducted noise component and an ambient sound component. The system is further configured to at least partial cancel the body conducted noise component using a first algorithm that is based on a second signal that temporally preceded (i.e., existed prior to) the first signal that is based on captured sound that is at least one of (i) completely isolated from the body conducted noise or (ii) completely comprised of the ambient sound. In an exemplary embodiment, the first signal is based on captured sound that is at least one of (i) free of body conducted noise or (ii) completely comprised of ambient sound. In an exemplary embodiment, the signal can correspond to for example the signal of path 1. Note further that the signal of path 2 can also correspond to this $2^{nd}$ signal. Granted, the signal of path 2 is based in part on a signal that included the body conducted noise component (albeit cancelled out from another signal, but based on that signal nonetheless). However, the signal of path 2 is also based on captured sound that, at least in some embodiments, meets at least one of these 2 requirements (the signal is based on captured sound that is at least one of completely isolated from the body conducted noise or the signal is based on captured sound that is completely comprised of ambient sound).

As noted above, the hearing prosthesis is configured to set an operational parameter of the noise cancellation system based on input from the external microphone 427. In an exemplary embodiment, the operational parameter can be set or otherwise identified by developing or otherwise obtaining adjustment data that corresponds to how the control algorithm used by the control unit 440 would adjust the filters 450 to cancel the body conducted noise component to achieve a result that addresses or otherwise reduces the effect of the aforementioned imperfections/transfer function shifts with the transducer system 480 (e.g., it could include compilation of pseudo filter coefficient settings, filter adjustments, etc.), and using that adjustment data. In some exemplary embodiments, the operational parameter is set in a manner concomitant with implementation of an error correction regime (it can also be developed in a manner concomitant with the development of such a regime). That is, in an exemplary embodiment, the data based on input from the microphone external to the recipient can be used to determine the error in the transducer system 480 and/or to determine the correction required to compensate for that error in the transducer system 480. The resulting operational parameter (e.g., a parameter that controls the algorithm of the filter control unit 440 that controls the filters 450) of the noise cancellation sub-system 460 is then used by the filter control unit 440 when the noise cancellation sub-system 460 is operational to cancel body noise.

In at least some exemplary embodiments, this resulting operational parameter is a static operational parameter. For example, the same operational parameter is used irrespective of the dynamic environment of the hearing prosthesis system 400. It is noted that while this resulting operational parameter can be a static parameter, the noise cancellation sub-system 460 can still operate a dynamic manner (e.g., the noise cancellation sub-system 460 can be an adaptive noise cancellation sub-system, where the operational parameter used to correct for the above noted issues in the transducer system 480 (error) is static). Alternatively, in an exemplary embodiment, the operational parameter can be in the form of a function, where the operational parameter varies based on varying input according to some form of algorithm. Still further, in an exemplary embodiment, the operational parameter can be an operational parameter that varies in response to changing dynamic environments of the hearing prosthesis system 400 without being bound to a specific function. By way of example only and not by way of limitation, tables can be developed and stored in the hearing prosthesis 400 that correlate inputs from one or more of signal paths 1, 4, 5 and/or 6 to correction/adjustment data that is used by the filter control unit 440 that would control the filters 450 to achieve noise cancellation that addresses or otherwise accounts at least in part for the above noted imperfections associated with the transducer system 480. During use of the noise cancellation sub-system 460, when input into control unit 440 corresponds to an exemplary scenario that corresponds (exactly, statistically and/or extrapolatedly) to that which is catalogued in the look up table, the control unit 440 can utilize the corresponding adjustment data on that look up table as a basis for controlling the filters 450. These are just some exemplary ways of implementing a noise cancellation regime that compensates for the above noted imperfections associated with the transducer system 480. Any device, system and/or method that can be utilized to enable the hearing prosthesis to at least partially cancel noise, including body conducted noise, utilizing an algorithm that is based on the output from an external microphone, whether it be part of the hearing prosthesis or otherwise, can be utilized in at least some embodiments Moreover, as detailed above, embodiments disclosed herein are generally focused on a noise cancellation system that is adaptive, where the control unit 440 utilizes feedback (a feedback loop represented by path 1 in FIG. 3B) to control adjustment of the filters 450 based on the feedback. However, in alternative embodiments, the noise cancellation system need not be adaptive, or at least not one that is reliant on a feedback loop, at least not in all instances to cancel noise, such as body conducted noise. Instead, in an exemplary embodiment, the noise cancellation system can be a system configured to adjust filters 450 (including set filters 450) without reliance on a feedback loop. More specifically, in an exemplary embodiment, the controller 440 can be configured to control the adjustable filters 450 based on the signals that are outputted by the implantable microphone 412 and/or the accelerometer 470. In this regard, while an adaptive noise cancellation system can utilize a feedback loop to adaptively adjust the filters 450 (or, more accurately, adjust the adjustment of the filters 450 based on feedback of the signal that results from adder 430), in an exemplary embodiment of a noise cancellation system, the adjustable filters 450 can be controlled without utilizing a feedback loop.

By way of example only and not by way of limitation, again, data tables can be developed and stored in the hearing prosthesis 400 that correlate the outputs of the microphones 412 and/or the accelerometer 470 (before and/or after the filter 450) to the corresponding control outputs of the control unit 440 that control the filters 450 to achieve noise cancellation that addresses or otherwise accounts at least in part for the above noted imperfections associated with the transducer system 480. When a given scenario is identified by the control unit 440 based on input from one or more of signal paths 4, 5 or 6 that corresponds (exactly, statistically and/or extrapolatedly) to that which is present in the look up table, the control unit 440 selects the corresponding control output associated there with and adjusts the filters 450 accordingly. In this regard, in an exemplary embodiment, the noise cancellation sub-system 460 can operate based entirely on an algorithm that does not utilize feedback from the noise cancellation sub-system. That said, in an exemplary embodiment, the noise cancellation sub-system 460 is configured to switch between modes (between algorithms and/or parameter sets) that utilize a feedback system and modes that do not utilize a feedback system, depending on circumstances.

Still further, it is noted that in at least some embodiments, the noise cancellation sub-system 460 does not dynamically change the filters 450 to address the imperfections associated with transducer system 480. Instead, in an exemplary embodiment, the filter coefficients 450 are set based on the above noted evaluations and comparisons, which setting alleviates at least in part the imperfections associated with transducer system 480. In this regard, at least some embodiments entail a noise cancellation sub-system that is not an adaptive noise cancellation sub-system, but is based on data developed in the data collection mode.

In at least some exemplary embodiments, there is a hearing prosthesis that has a noise cancellation sub-system configured to at least partially cancel body conducted noise from a signal that is output from an implantable microphone utilizing an implantable accelerometer, wherein the implantable accelerometer is isolated from energy resulting from ambient sound in an imperfect manner (i.e., due to natural physical constraints associated with engineering, design and reduction to practice, the accelerometer will receive more than zero percent, however limited, of the energy from the ambient sound received by the implantable microphone), which energy is captured by the implantable microphone in used by the hearing prosthesis to evoke a hearing percept. The noise cancellation sub-system is configured to reduce the effects of this imperfect isolation of the accelerometer utilizing signal filtering by removing at least about 50%, 55%, 60%, 65%, 70%, 75%, 80%, 85%, 90%, 91%, 92%, 93%, 94%, 95%, 96%, 97%, 98% and/or about 99% or more (e.g., about 100%) or any value or range of values therebetween in about 0.1% increments (e.g., 67.5% to 99.9%, at least about 90.3%, etc.) of the component of the energy of the ambient sound in the output signal of the accelerometer per frequency band (the amount may be the same across frequency bands or can vary across frequency bands) relative to that which would be the case in the absence of such utilized signal filtering. In an exemplary embodiment, the signal filtering is achieved by controlling the filters in accordance with the teachings detailed herein.

In at least some exemplary embodiments, the noise cancellation sub-system is configured to reduce the component of the energy resulting from the ambient sound in the output of the accelerometer utilizing signal filtering such that the signal output from adder 430 and/or output from switch 434 is at least about 80%, 85%, 90%, 91%, 92%, 93%, 94%, 95%, 96%, 97%, 98% and/or about 99% or more (e.g., about 100%) or any value or range of values therebetween in about 0.1% increments in correlation with a signal outputted directly from an external microphone that is part of the hearing prosthesis based on the exact same ambient sound that created the energy captured by the accelerometer. In an exemplary embodiment, the signal filtering is achieved by controlling the filters in accordance with the teachings detailed herein.

Figure 4:
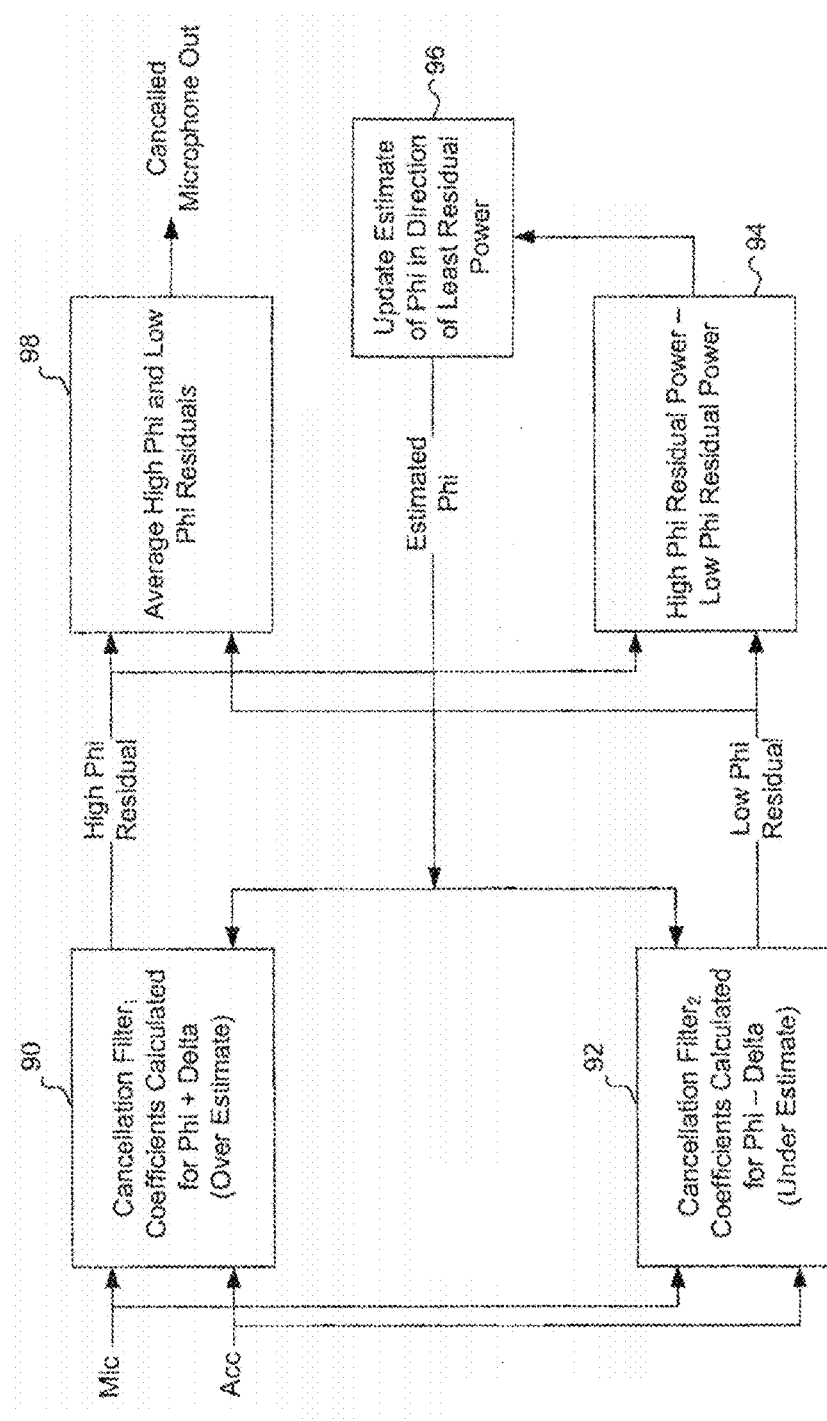
FIG. 4 is a schematic illustration of an embodiment of an implantable hearing prosthesis that utilizes a plurality of cancellation filters.

As noted above, at least some exemplary embodiments of the teachings detailed herein can be utilized to address or otherwise compensate for the imperfections associated with the transducer system 480. Alternatively and/or in addition to this, at least some exemplary embodiments can be utilized to address or otherwise compensate for one or more phenomena associated with the implementation of the noise cancellation systems of FIGS. 2-3B, irrespective of the utilizations of paths 2-6 that sometimes occurs. This phenomenon will now be described (along with the framework of the systems associated therewith) wherein the teachings detailed herein can have, in some embodiments, utilitarian value with respect to these phenomena FIG. 4 presents a functional diagram of an exemplary adaptive filter arrangement that utilizes an adaptive filter that adapts based on current operating conditions (e.g., operating environment) of the implantable hearing prosthesis. It is noted that the teachings detailed herein and/or variations thereof can be combined with some or all of the teachings of U.S. Patent Application Publication No. 2012/0232333, published on Sep. 13, 2012, to Inventor Scott Allan Miller. In this regard, at least some embodiments include devices, systems and/or methods that utilize one or more or all of the teachings of U.S. Patent Application Publication No. 2012/0232333 in combination with one or more or all of the teachings detailed herein. Is further noted that in at least some embodiments detailed herein, the adaptive noise cancellation systems and methods of the aforementioned US patent application publication can be utilized with the hearing prosthesis systems detailed herein.

There are some scenarios where such operating conditions are often not directly observable/are not directly observed even though they might be able to be directly observed utilizing certain components that might not be present in the hearing prostheses. That is, the operating conditions form a latent parameter. Accordingly, the system is operative to estimate this latent parameter for purposes of adapting to current operating conditions. Stated otherwise, the system utilizes a latent variable adaptive filter.

In an exemplary embodiment, the latent variable adaptive filter (LVAF) is computationally efficient, converges quickly, can be easily stabilized, and its performance is robust in the presence of correlated noise. It can be based on IIR filters, but rather than adapting all the coefficients independently, it can utilize the functional dependence of the coefficients on a latent variable. In statistics, a latent variable is one which is not directly observable, but that can be deduced from observations of the system. An example of a latent variable is the thickness of the tissue over the microphone and/or wave propagation properties through the tissue over the microphone. In at least some exemplary embodiments, this is not directly measured, but instead is deduced from the change in the microphone motion sensor (i.e., mic/acc) transfer function. Another hidden variable may be user "posture." It has been noted that some users of implantable hearing instruments experience difficulties with feedback when turning to the left or the right (usually one direction is worse) if the (nonadaptive) cancellation filter has been optimized with the recipient facing forward. Posture could be supposed to have one value at one "extreme" position, and another value at a different "extreme" position. "Extreme," in this case, is flexible in meaning; it could mean at the extreme ranges of the posture, or it could mean a much more modest change in posture that still produces different amounts of feedback for the recipient. Posture in this case can be a synthetic hidden variable (SHV), in that the actual value of the variable is arbitrary; what is important is that the value of the hidden variable changes with the different measurements. For instance, the value of the SHV for posture could be "+90" for the recipient facing all the way to the right, and "−90" for a recipient facing all the way to the left, regardless of whether the recipient actually rotated a full 90 degrees from front. The actual value of the SHV is arbitrary, and could be "−1" and "+1," or "0" and "+1" if such ranges lead to computational simplification.

It is noted that while the teachings detailed herein relating to the parameters are described in terms of the embodiments where the parameters are posture parameters, the parameters can be other parameters. Indeed, in an exemplary embodiment, the noise cancellation sub-systems detailed herein and/or variations thereof can track any impairment of the system, at least as long as the presence of the impairment can be detected. For example, an impairment could arise from for example an overflow of an internal register which, in some instances can cause oscillations in the outputs.

In the case of posture, in an exemplary embodiment, a physical parameter(s) are assigned to the SHV, such as the angle that the recipient is turned from facing forward. However, there are other cases in which the variable is truly hidden. An example might be where the recipient activates muscle groups internally, which may or may not have any external expression. In this case, if the tonus and non-tonus conditions affect the feedback differently, the two conditions could be given values of "0" and "+1," or some other arbitrary values. One of the advantages of using SHVs is that only the measurements of the vibration/motion response of the microphone assembly need to be made, it may be utilitarian not to measure the actual hidden variable. That is, the hidden variable(s) can be estimated and/or deduced.

As shown in FIG. 4, the adaptive system can utilize two adaptive cancellation filters 90 and 92 instead of one fixed cancellation filter. The cancellation filters are identical and each cancellation filter 90, 92, can include an adaptive filter (not shown) for use in adjusting the motion accelerometer signal, Acc, to match the microphone output signal, Mic, and thereby generate an adjusted or filtered motion signal. Additionally, each cancellation filter can include a summation device (not shown) for use in subtracting the filtered motion signals from the microphone output signals and thereby generate cancelled signals that are an estimate of the microphone response to desired signals (e.g., ambient acoustic signals). Each adaptive cancellation filter 90, 92 estimates a latent variable 'phi', a vector variable which represents the one or more dimensions of posture or other variable operating conditions that change in the recipient, but whose value is not directly observable. The estimate of the latent variable phi is used to set the coefficients of the cancellation filters to cancel out microphone noise caused by, for example, feedback and biological noise. That is, all coefficients of the filters 90, 92 are dependent upon the latent variable phi. After cancellation, one, both or a combination of the cancelled microphone signals, essentially the acoustic signal, are passed onto the remainder of the hearing instrument for signal processing.

In order to determine the value of the latent variable phi that provides the best cancellation, the coefficients of the first cancellation filter 90 are set to values based on an estimate of the latent variable phi. In contrast, the coefficients of the second cancellation filter 92, called the scout cancellation filter 92, are set to values based on the estimate of the latent variable phi plus (or minus) a predetermined value delta. Alternatively, the coefficients of the first filter 90 may be set to values of the latent variable plus delta and the coefficients of the second filter may be set to values of the latent variable minus delta. In this regard, the coefficients of the second adaptive filter 92 are slightly different than the coefficients of the first filter 90. Accordingly, the energies of the first and second cancelled signals or residuals output by the first and second adaptive cancellation filters 90, 92 may be slightly different. The residuals, which are the uncancelled portion of the microphone signal out of each cancellation filter 90, 92, are compared in a comparison module 94, and the difference in the residuals are used by the Phi estimator 96 to update the estimate of phi. Accordingly, the process may be repeated until the value of phi is iteratively determined. In this regard, phi may be updated until the residual value of the first and second cancellation filters is substantially equal. At such time, either of the cancelled signals may be utilized for subsequent processing, or, the cancelled signals may be averaged together in a summation device 98 and then processed.

Adjustment of the latent variable phi based on the comparison of the residuals of the cancelled signals allows for quickly adjusting the cancellation filters to the current operating conditions of the implantable hearing instrument. To further speed this process, it may be utilitarian to make large adjustments (i.e., steps) of the latent value, phi. For instance, if the range of the phi is known (e.g., 0 to 1) an initial mid-range estimate of phi (e.g., ½) may be utilized as a first estimate. Alternatively, the initial values of phi can be set at 0 (which can correspond to a relaxed posture, with respect to embodiments where phi is related to posture), and iteration proceeds from those values.

Likewise, the step size of the adjustment of phi may be relatively large (e.g., 0.05 or 0.1) to allow for quick convergence of the filter coefficients to adequately remove noise from the microphone output signal in response to changes in the operating conditions.

In order to implement the system of FIG. 4, in at least some embodiments, a filter is generated where the filter coefficients are dependent upon a latent variable that is associated with variable operating conditions/environment of the implantable hearing instrument. FIGS. 5-8 provide a broad overview of how dependency of the adaptive filter on varying operating conditions can be established in at least some embodiments.

Figure 5:
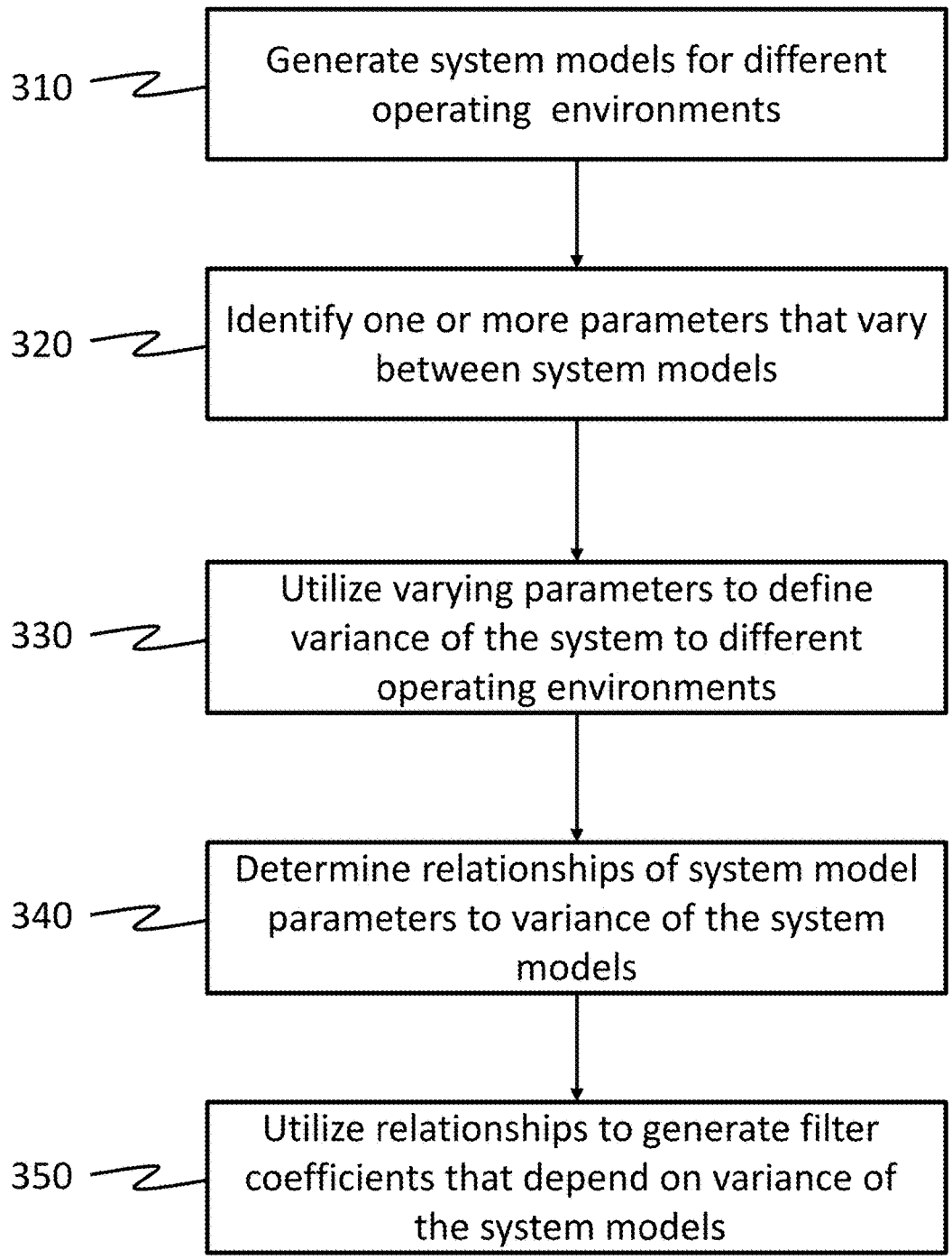
FIG. 5 depicts an exemplary flow chart according to another exemplary process.

FIG. 5 illustrates an overall process for generating the filter. Initially, the process requires two or more system models be generated for different operating environments. For instance, system models can be generated while a recipient is looking to the left, straight ahead, to the right and/or tilted. The system models may be generated as discussed above and/or as discussed in U.S. Patent Application Publication No. 20120232333 and/or according to any utilitarian methodology. Once such system models are generated at action 310, parameters of each of the system models may be identified at action 320. Specifically, parameters that vary between the different system models and hence different operating environments can be identified at action 320.

Figure 6:
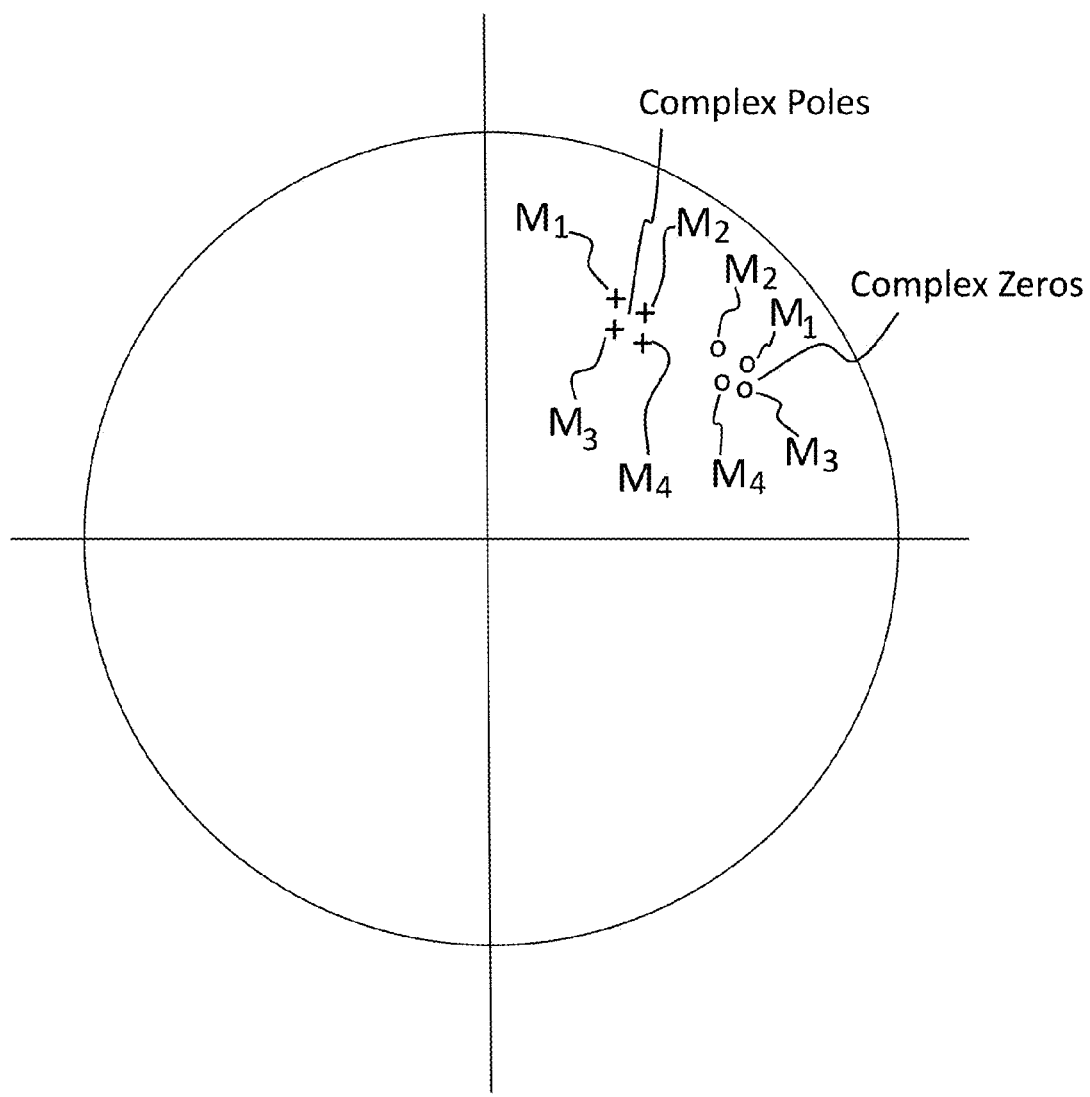
FIG. 6 depicts a plot of operating parameters in a unit circle.
Figure 7:
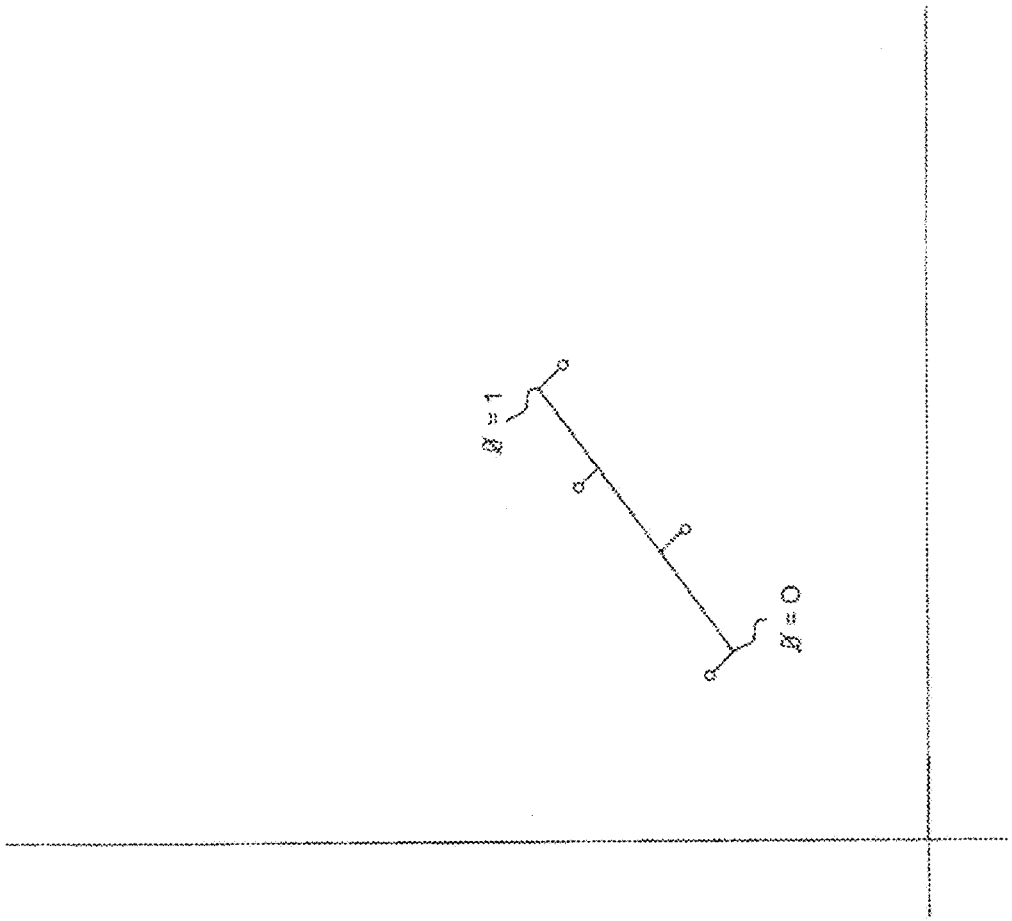
FIG. 7 illustrates the fitting of a line to a first set of operating parameters to define a range of a latent variable.

For instance, each system model can include multiple dimensions. Such dimensions may include, without limitation, gain, a real pole, a real zero, as well as complex poles and zeros. Further, it will be appreciated that complex poles and zeros may include a radius as well as an angular dimension. In any case, a set of these parameters that vary between different models (i.e., and different operating environments) may be identified. For instance, it may be determined that the complex radius and complex angle and gain (i.e., three parameters) of each system model show variation for different operating conditions. For instance, FIG. 6 illustrates a plot of a unit circle in a "z" dimension. As shown, the complex zeros and complex poles for four system models $M_1$ to $M_4$ are projected onto the plot. As can be seen, there is some variance between the parameters of the different system models. However, it will be appreciated that other parameters can be selected. In at least some embodiments, the parameters that are selected are selected such that they vary between the system models and this variance is caused by change in the operating condition of the implantable hearing instrument.

Figure 8:
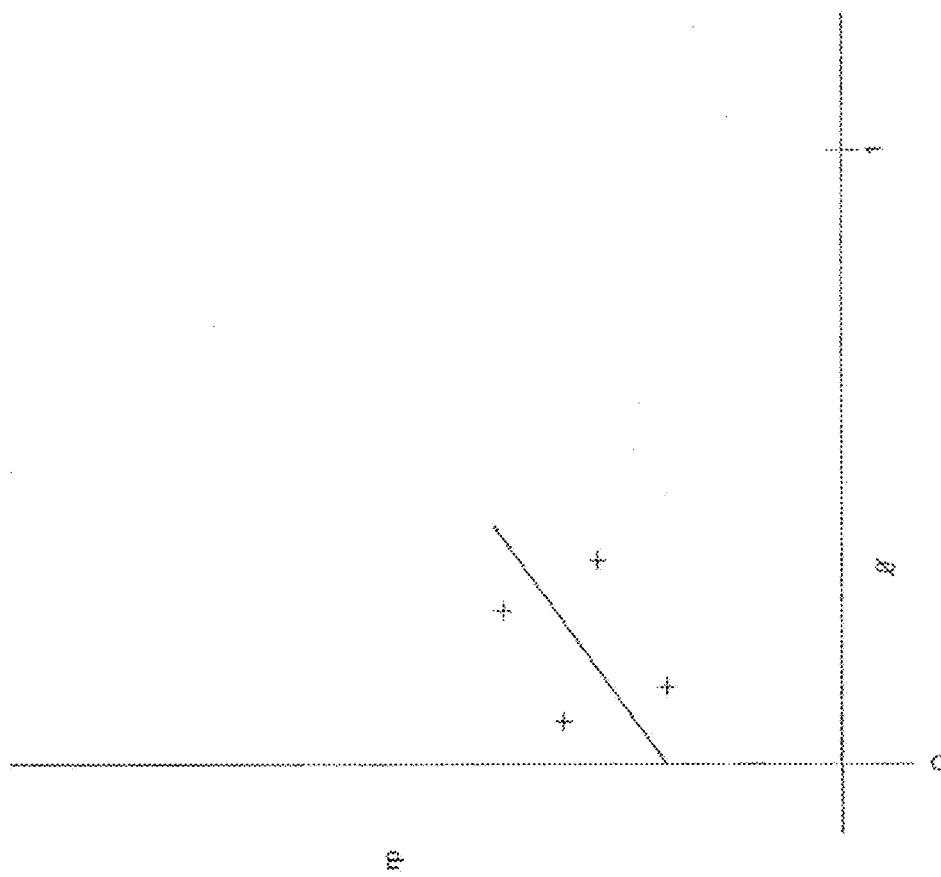
FIG. 8 illustrates a linear regression analysis of system parameters to the latent variable.

Once the variable parameters are identified at action 320, they can be projected onto a subspace (action 330). In the present arrangement, where multiple parameters are selected, this can entail executing a principle component analysis on the selected parameters in order to reduce their dimensionality. Specifically, in the present embodiment, principle component analysis is performed to reduce dimensionality to a single dimension such that a line can be fit to the resulting data points. (See, for example, FIG. 7.) Accordingly, this data can represent operating environment variance or latent variable for the system. For instance, in the present arrangement where four system models are based on four different postures of the user, the variance can represent a posture value. Further, the plot can define the range of the latent variable. That is, a line fit to the data may define the limits of the latent invariable. For instance, a first end of the line may be defined as zero, and the second end of the line may be defined as one. At this point, a latent variable value for each system model may be identified. Further, the relationship of the remaining parameters of each of the system models can be determined relative to the latent variables of the system models (e.g., action 340). For instance, as shown in FIG. 8, a linear regression analysis of all the real poles of the four system models to the latent variable may be projected. In this regard, the relationship of each of the parameters (i.e., real poles, real zeros, etc.) relative to the latent variables may be determined. For instance, a slope of the resulting linear regression may be utilized as a sensitivity for each parameter. Accordingly, this relationship between the parameters and the latent variable are determined, this information may be utilized to generate a coefficient vector, where the coefficient vector may be implemented with the cancellation filters 90, 92 of the system of FIG. 4 (action 350). As will be appreciated, the coefficient vector will be dependent upon the latent variable. Accordingly, by adjusting a single value (the latent variable), all of the coefficients may be adjusted.

It is noted that in some embodiments, a cancellation algorithm according to the teachings above and or variations thereof can be impacted in a deleterious manner by own voice body conducted noise. That is, bone conduction/body conduction sound originating from the recipient's own voice/resulting from the vibrations of the recipient's vocal cords, which hereafter is often simply referred to as "own voice body conducted noise phenomenon," or "own voice phenomenon" for linguistic convenience, and unless otherwise specifically indicated to the contrary, the latter phrase corresponds to noise resulting from a recipient's own voice that is conducted through tissue (e.g., bone) to an implanted microphone. In an exemplary scenario, this is caused by a relatively large amount of acceleration signal which is present in the microphone channel and the accelerometer channel. As a result, the noise cancellation algorithm can, in some instances, respond to own voice signals inappropriately, causing the state variables associated with the parameters (e.g., posture parameters, etc.) to ramp to larger values, eventually hitting the allowed limits of operation. After the own voice phenomenon ceases, the parameters usually return to their appropriate values.

Figure 9:
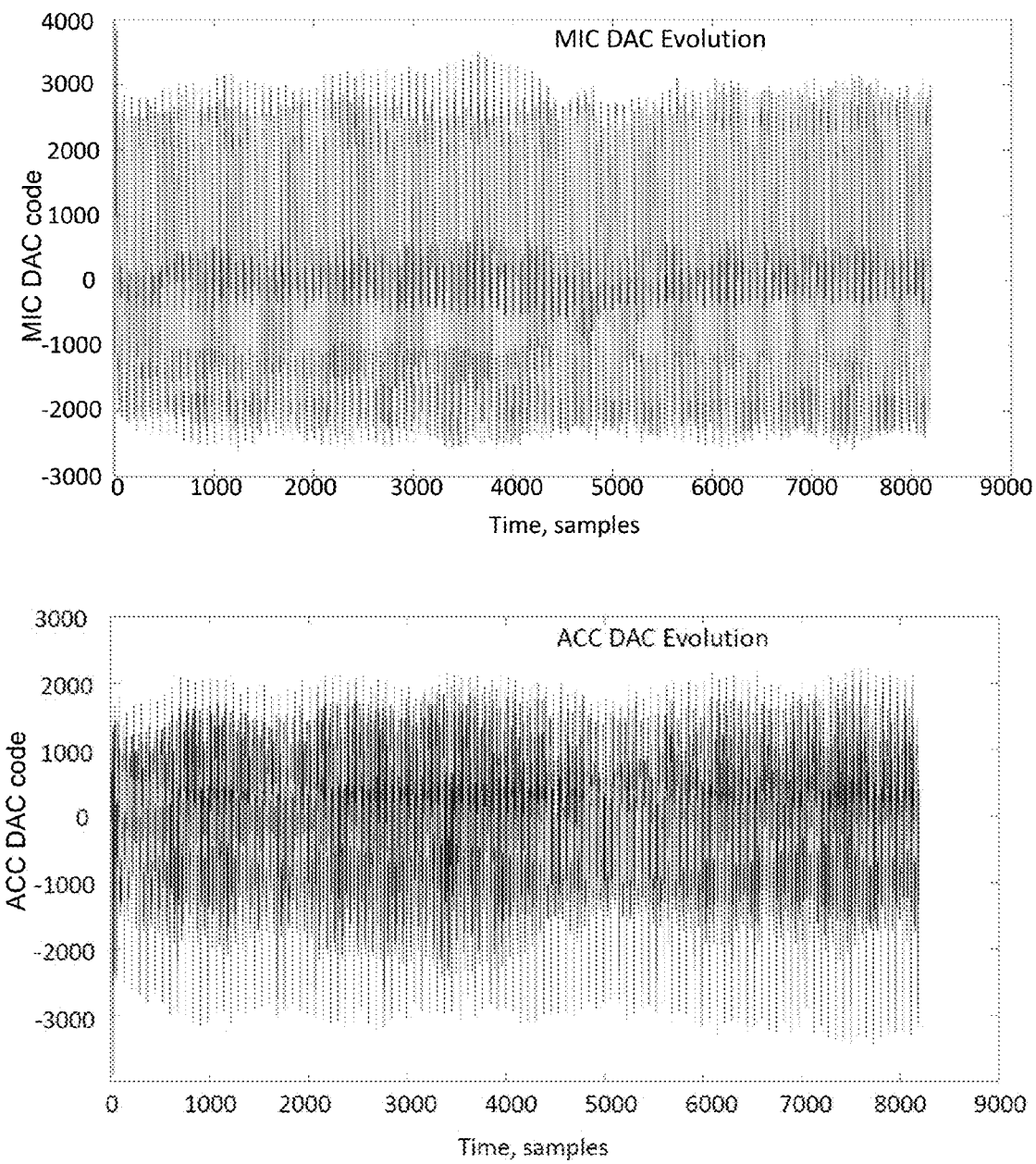
FIG. 9 depicts graphs of microphone ADC output and accelerometer ADC outputs vs. time for a scenario where an own voice body conducted noise phenomenon causes a noise cancellation algorithm to pursue an incorrect set of parameters.

The acceleration transfer function of the accelerometer 470, relative to the acceleration transfer function of the microphone 412, is fixed for a given parameter (e.g., posture parameter). In some scenarios, there can be deviation from the fixed relationship when excited by own voice in some recipients. As a result, the feedback cancellation algorithm pursues an incorrect set of parameters as long as own voice excitation continues. If the deleterious scenario occurs at all, it typically occurs during loud, harmonic phonemes (e.g., vowels), but is distinct from nonlinearity issues such as saturation of the signal chain. More specifically, FIG. 9 depicts graphs of microphone 412 (MIC) ADC output and Accelerometer 470 (ACC) ADC outputs vs. time for a scenario where own voice phenomenon causes the algorithm to pursue an incorrect set of parameters. As can be seen, the MIC and ACC ADC values are not close to saturating levels, which would be about 32,767 to −32,768, and the graphs do not show any of the classic clipping that might be expected.

The following exemplary embodiments are directed towards cancellation algorithms that utilize posture as a parameter.

Figure 10:
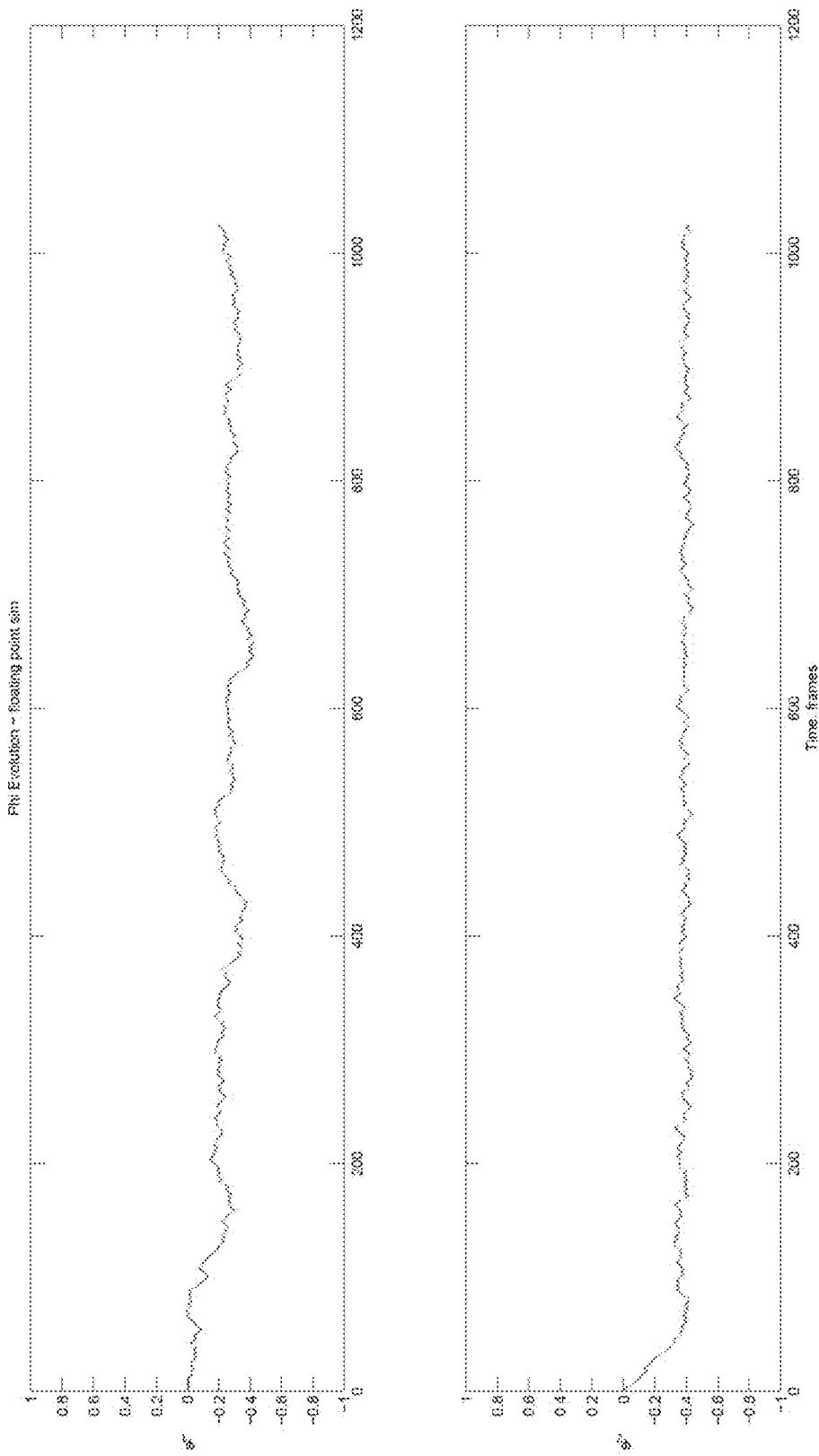
FIG. 10 depicts a graph of phi versus time for a normal evolution of posture variables phi1 and phi2 in a scenario where the effects of own voice body noise do not impact the noise cancellation algorithm.

FIG. 10 depicts graph of phi versus time (in frames of 1 sample per 16 kHz) for a normal evolution of posture variables phi1 and phi2 in the scenario where the effects of own voice body noise do not impact the algorithm, or at least the algorithm is able to cope with the effects of own voice body noise. The limits of phi 1 and phi2 are +/−1. As can be seen, the values phi1 and phi2 deviate from the initial value of zero, but generally stay away from the limits (+/−1).

Figure 11A:
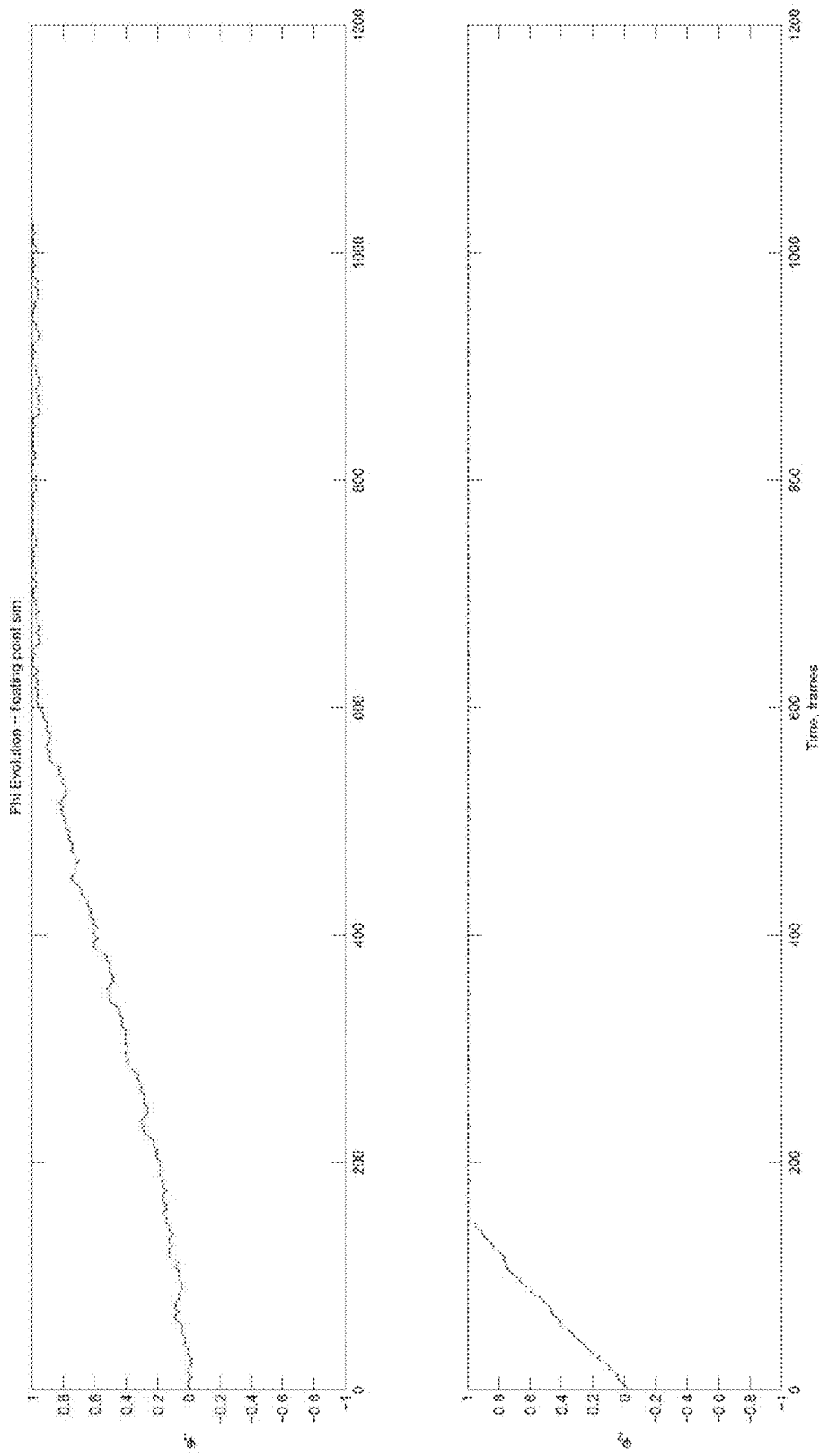
FIG. 11A depicts a graph of phi versus time for a normal evolution of posture variables phi1 and phi2 in a scenario where the effects of own voice body noise impact the noise cancellation algorithm.

FIG. 11A also depicts graph of phi versus time where the effects of own voice body noise impact the algorithm in a manner in which the algorithm is affected in a deleterious manner. More particularly, FIG. 11A depicts a graph where the phoneme "EEEEEE" is intoned in a relatively loud manner by the recipient. As can be seen, the effects of own voice body noise cause the values of phi1 and phi2 to ramp from the initial value of zero to the limit 1, and stay there, or relatively close thereto, for as long as the recipient is vocalizing the aforementioned phoneme.

As noted above, own voice phenomena that results in the values of phi ramping towards the limits can have a deleterious effect on the noise cancellation algorithm. For example, own voice phenomenon prevents the recipient from receiving, in part and/or in whole, the utilitarian effects of feedback cancellation, at least while talking. This can be because the values of phi do not stabilize and, in some instances, can go to the limits. In some instances where real-time values of phi are being utilized for noise cancellation, the ramped up phi values can potentially induce noise into the system. Further, the own voice phenomenon takes time to pull the parameters away from their correct values due to the time constraints in the feedback correction algorithm that is used to improve the resistance the algorithm to noise. Corollary to this is that it can also take time, sometimes about the same amount of time, sometimes more, sometimes less, for the algorithm to recover (e.g. it may take about the same time to roughly retrace the trajectory caused by the own voice phenomenon). For example, with regard to FIG. 11A, the time for ramping up is about 37.5 ms, and the time to recover would also be about 37.5 ms. This can correspond to about 75 ms where the full utilitarian effects of feedback cancellation are not available to the recipient.

According to an exemplary embodiment, there are devices systems and methods that at least partially address this own noise phenomenon. More specifically, in an exemplary embodiment, parameters are developed based on data obtained from the external microphone 427, which, because it is not implanted in the recipient, generates output that is unaffected by the own noise phenomenon linked to body conducted noise. The data from the external microphone is utilized to develop an algorithm that controls the adaptive noise cancellation sub-system 460 by limiting the adaptation of the sub-system based on the data from the external microphone so that the adaptive noise cancellation sub-system 460 is prevented from going to the limits noted above (either by halting the adaptation at a location before the limits are reached (e.g., freezing the filters) or by implementing another algorithm for the adaptive system that will not lead to the limits being reached or by some other mode that can enable the teachings detailed herein and/or variations thereof to be practiced. In this regard, in a manner analogous to developing the control parameter developed above, signal path 1 can be compared to signal path 3 and/or the output of signal path 2 can be evaluated when the hearing prosthesis is utilized in the external microphone-based mode with the adaptive noise cancellation sub-system 460 operational, but where the output thereof is not utilized to evoke a hearing percept (data collection mode). The instances where the own voice body noise content of the signal from microphone 412 and/or the accelerometer 470 is sufficient to cause the deleterious phenomenon noted above can be identified by evaluating the input from path 2 in any way that will enable such to be accomplished. For example and not by way of limitation, a large (e.g., statistically significant/ significant as compared to empirical data) and/or sudden and/or temporally brief change from a typical input from path 2 can be an indicator that the above own voice body noise phenomenon has occurred. Alternatively or in addition to this, the input from path 1 can be compared to the input of path 3 (or input from any other pertinent path(s) can be compared). Based on the aforementioned evaluations and/or comparisons, an algorithm is then developed that prevents the filter control unit 440 from adjusting the filters 450 outside of a given range, thus preventing the own voice body conducted noise from significantly deleteriously affecting the noise cancellation sub-system 460.

Accordingly, in an exemplary embodiment, the above-noted action of limiting the adaptation of the noise cancellation sub-system includes preventing filters of the system from adapting to have certain coefficients based on the data developed based on the ambient sound captured by the external microphone.

Concomitant with the teachings above associated with developing the lookup tables and/or the functions for use in controlling the noise cancellation sub-system, an exemplary embodiment includes obtaining pseudo noise cancellation sub-system operational parameters indicative of how the sub-system should operate to cancel body conducted noise and limiting the operation of the system to the pseudo noise cancellation system operational parameters. In an exemplary embodiment, the pseudo noise cancellation sub-system operational parameters can correspond to an algorithm/be used in an algorithm in which extreme filter values are identified based on data received during the external microphone-based mode with respect to how the filters 450 should adapt to output a signal that corresponds to or otherwise is no more extreme than that which would be outputted if the input into the filter control unit 440 via the various paths corresponded to a perfect, or at least more perfect, operation of the transducer system 480. Alternatively and/or in addition to this, the pseudo noise cancellation sub-system operational parameters can be limits on the filters. In an exemplary embodiment, the pseudo noise cancellation sub-system operational parameters can be filter coefficient values that are prohibited from being used by the hearing prosthesis system 400. In at least some exemplary embodiments, the pseudo noise cancellation sub-system operational parameters can be any parameter that is based on data developed with the above detailed operation of the hearing prosthesis system 400 in the external microphone-based mode with the noise cancellation sub-system 460 in the data collection mode that can be utilized in the operation of the hearing prosthesis system 400 that will avoid the above noted own body noise phenomenon from occurring. Thus, in an exemplary embodiment, the action of controlling the adaptive noise cancellation system of the implantable sound capture system based at least in part on the first data includes at least one of limiting coefficients of the adaptive filters of the adaptive noise cancelation system to the pseudo adaptive filter coefficients or preventing the coefficients of the adaptive filters from having values beyond extreme values of the pseudo adaptive filter coefficients.

In view of the above, in an exemplary embodiment, the action of obtaining pseudo noise cancellation system operational parameters includes comparing data based on an output signal of an implantable microphone of the implantable sound capture system that is based on sound captured by the implantable microphone (e.g., the input from path 1 or path 4 or the output from adder 430 into the adder 432)

to a signal based on the ambient sound captured externally to the recipient (e.g., the input from path 3 or the input into adder 432), wherein the sound captured by the implantable microphone originates from the same source of sound as that which originated the sound captured externally to the microphone (because the sound captured by the external microphone 427 is the same sound that impinges upon the skin of the recipient causing energy to propagate through the skin of the recipient to the transducer system 480). Further, the exemplary method includes developing pseudo adaptive filter coefficients based on a comparison where the comparison can correspond to the summation at summer 432, the resulting input of path 2 being the result of that comparison.

It is noted that in an exemplary embodiment, the above noted methods further include configuring the hearing prosthesis system 400 with the above noted developed pseudo noise cancellation system operational parameters and/or pseudo adaptive filter coefficients. Corollary to this is that in an exemplary embodiment, there is a hearing prosthesis system according the teachings detailed herein and/or variations thereof are configured with the above noted developed pseudo noise cancellation system operational parameters and/or pseudo adaptive filter coefficients.

Still further, by way of example only and not by way of limitation, in at least some embodiments, operational parameters can be developed (e.g. such as the pseudo noise cancellation system operational parameters) utilizing one or more or all of the above detailed methods and/or variations thereof or other methods (any method that can be utilized) that, when applied to the noise cancellation sub-system 460, account for short-term variations in the ambient conditions of the implanted transducer system 480. Indeed, as is understood from the above, the pseudo operational parameters can be utilized to compensate for changes in posture, such as the scenario which the recipient turns his or her head to the side, which thus results in different tensions on the skin which changes the noise cancellation sub-system's response to ambient sound and or body conducted noises. Still further, by way of example only and not by way of limitation, a recipient of the hearing prosthesis system 400 can be exposed to a scenario where the surroundings of the recipient changes. For example, the pressure altitude the recipient can change (e.g., in the case of a recipient flying in a modern pressurized commercial jetliner), etc. In such exemplary scenarios, this can change the pre-load on the membranes/diaphragms of the transducer system 480. This means that in at least some instances, the settings of filter 450 should be different to achieve the noise cancellation effects having comparable utilitarian value as that which was the case before the change in the surroundings the recipient resulting in the change of the preload on the membranes/diaphragms of the transducer system 480 (e.g., the settings for noise cancelation having utilitarian value at sea level).

Utilizing the above detailed methods and/or variations thereof or other methods to develop the pseudo operational parameters after the recipient has changed his or her surroundings, the results of the change in the pre-loading on the membranes/diaphragms can be accounted for, at least in part, by the noise cancellation sub-system 460 by utilizing those developed pseudo operational parameters during the period in which the recipient is in the new surroundings. By way of example only and not by way of limitation, in an exemplary embodiment, a recipient may board an airliner, and, shortly after takeoff, after the aircraft has attained a pressure altitude of 8,000 feet or more (or whatever is used by the applicable airframe manufacturer as the pressure in the cabin), for example, the recipient may utilize the hearing prosthesis system 400 in the external microphone-based mode with the noise cancellation subsystem 460 and the data collection mode to develop the pseudo operational parameters (which parameters can be automatically developed by the hearing prosthesis system 400 and/or utilizing an add-on component (e.g. a portable laptop configured to be connected to the hearing prosthesis 400, which portable laptop has more processing power than the hearing prosthesis 400, and thus in which the algorithms are developed and then transferred to the hearing prosthesis system 400)), which pseudo operational parameters can be utilized by the hearing prosthesis system 400 during a subsequent action of evoking a hearing percepts based on input into the implanted microphone 412. Such can have utilitarian value in that it can improve the performance of the adaptive noise cancellation sub-system 460 relative to that which would be the case utilizing an algorithm that is based on a sea level model/sea level data. Such can also have utilitarian value in that the above noted deleterious effects associated with own body noise can still be avoided utilizing limitations on the filters 450. In this exemplary scenario, the recipient can utilize the newly developed parameters while on board the aircraft at cruising altitude/while the pressure in the cabin is at the given pressurization for cruising. At the end of the flight, the recipient can then transition hearing prosthesis 400 back to the original parameters that existed before the flight or other parameters as may be developed utilizing teachings detailed herein and or variations thereof. That said, in an alternative embodiment, the hearing prosthesis system 400 can be configured to perform this automatically upon a determination that the environment that prompted the change in the parameters/prompted the development of a new parameters has gone away/the recipient is no longer in that environment. Corollary to this is that in at least some embodiments, the hearing prosthesis system 400 is configured to determine that a given environment has changed, and thus automatically implement the different parameters developed utilizing the hearing prosthesis in the data collection mode that was developed according the teachings detailed herein and or variations thereof.

In this regard, an exemplary embodiment entails real time adaptive calibration, or at least proximate time adaptive calibration, of an implantable sound capture system, the difference between the two being that in the latter, data may be obtained utilizing the external microphone during a first temporal period and then data may be obtained utilizing the implantable microphone during a second temporal period, the two periods being different from one another (completely separate, overlapping), where the first and second temporal periods do not necessarily indicate the order in which the data is collected. The latter can have utilitarian value in scenarios where processing power is limited, and where the environments of the first and second temporal periods can be controlled. (This will be described in greater detail below.)

Some exemplary calibration methods and systems used to implement such methods can enable calibration activity to equalize the implantable microphone's frequency response to match that of the external microphone's frequency response. This can enable adaptive calibration to be applied to reduce the distortion of the implanted microphone due to changes in the environment (both chronic changes in the recipient, such as fibrous tissue growth, weight gain, skin thinning, etc., and acute changes, such as wearing a hat, changing a hairstyle, changes in altitude, etc.).

More particularly, because the implanted microphone system is implanted, the energy that is received by the system resulting from the ambient sound is distorted by the recipient's anatomy. Various factors affect the distortion. For example, the thickness of the skin flap, the extent of fibrous tissue growth proximate the microphone, the amount and location of hair on the scalp, etc., can vary the distortion. While the above embodiments have concentrated at least in part on body noise and noise cancellation thereof, the following concentrates on the more general distortion phenomena. Consistent with the above, because the external microphone can be considered a true representation of the actual sound of the surroundings (e.g., what the recipient of the hearing prosthesis wants to hear), the external microphone can be utilized as a reference to calibrate the implanted hearing prosthesis. In an exemplary embodiment, the external microphone that is utilized as the reference has a known frequency response and/or has been calibrated during production and/or is of a known design having a stable frequency response. An exemplary embodiment entails comparing output from the external microphone to output from the implanted microphone to enable calibration and/or diagnostic features, as will now be detailed.

Continuing with the aforementioned airline travel scenario where the recipient changes pressure altitudes (and somewhat analogous to, albeit in a potentially less drastic scenario, the situation where the recipient lives in a mountainous region where the pressure altitude of the recipient changes on a frequent basis due to travel), the teachings detailed herein can have utilitarian value with respect to addressing a phenomenon associated with the implantable microphone that does not have a pressure equalization system (e.g., do not have a system analogous to the Eustachian tube system of a human). In this regard, the implantable microphone is hermetically sealed from the ambient environment, where a diaphragm and/or a membrane makes up a portion of the external surface of the implantable microphone. In this exemplary embodiment, a microphone element in the implanted microphone is inside the hermetic enclosure of the implantable microphone in pressure communication with the diaphragm/membrane. The internal pressure of the microphone does not change (as the gas inside is at a constant temperature in a fixed volume), or at least does not change by an appreciable amount, with change in ambient pressure of the recipient. Conversely, the external pressure does change due to changes in altitude (corollary to this, the pressure changes due to being underwater, etc.). This causes the diaphragm/membrane to be biased in a particular direction, which changes its frequency response, and thus can cause the sound evoked by the hearing prosthesis to be distorted, all things being equal.

Utilizing the teachings detailed herein to obtain first and second data from the respective external microphone and implantable microphone, in calibrating the sound capture system utilizing the first and second data according to the teachings detailed herein can be utilized to compensate for the fact that the frequency response of the diaphragm/membrane has changed. It is noted that while the embodiments utilizing this calibration can be implemented via the noise cancellation sub-system, alternate embodiments can be implemented to other systems other than a noise cancellation sub-system. Accordingly, while the embodiments detailed herein are generally described in terms of a noise cancellation system, the teachings detailed herein and/or variations thereof can be implemented utilizing a different type of system, such as a system configured to specifically enable the calibration techniques detailed herein. Thus, unless otherwise specified, any disclosure of a noise cancellation system/sub-system herein corresponds to a disclosure of a more generic system and/or a specific system (e.g., a calibration system, a calibration/noise cancellation sub-system, etc.), providing that the teachings detailed herein and/or variations thereof are enabled. Any device, system and/or method that can enable the teachings detailed herein and/or variations thereof to be practiced can be utilized in at least some embodiments. Corollary to this is that while the embodiments detailed herein are often focused on body noise cancellation, the teachings detailed herein are also applicable to sound management techniques irrespective of the presence and/or absence of body noise.

Accordingly, in an exemplary embodiment, there is a hearing prosthesis, comprising an implantable microphone and sound management system (e.g., a noise cancellation sub-system, a calibration sub-system, etc.), wherein the hearing prosthesis is configured to set at least one operational parameter of the sound management system based on input from a microphone external to the recipient of the implantable microphone. In an exemplary embodiment of this embodiment, the setting of the at least one operational parameter at least partially compensates for a changed frequency response of the implanted microphone diaphragm and/or one or more other changes in the system that impacts that perceived sound. In an exemplary embodiment, the at least one operational parameter is changed by adjusting filters of the sound management system. In an exemplary embodiment, the at least one operational parameter is changed by adjusting a gain of the sound management system. Still further, by way of example only and not by way of limitation, the management of frequency channels can be adjusted. For example, certain frequency channels can be deemphasized and others emphasized relative to that which was the case prior to the change, so as to calibrate the sound management system such that the evoked hearing percepts are more consistent with that which would be the case if the hearing percept was based on the external microphone instead of the implantable microphone.

Still further, in an exemplary embodiment, there is a hearing prosthesis configured to enable the recipient to initiate a calibration routine that will calibrate the sound management system based on data from an external microphone. Alternatively and/or in addition to this, in an exemplary embodiment, there is a hearing prosthesis configured to automatically initiate a calibration routine that will calibrate the sound management system based on data from an external microphone. In an exemplary embodiment, the hearing prosthesis can be configured to periodically automatically obtain data from the external microphone, and upon a determination that the divergence between the hearing percepts evoked utilizing the implantable microphone and those which would be evoked utilizing the external microphone has reached a certain level, the hearing prosthesis can automatically enter into the calibration routine. Alternatively and/or in addition to this, the hearing prosthesis can provide an indication to the recipient indicating that calibration may have utilitarian value, or at least more utilitarian value in a given instance relative to that which was the case during a temporally proceeding period of time. Alternatively and/or in addition to this, the hearing prosthesis can be configured to provide data to a third-party indicating that the hearing prosthesis has experienced a change in the ambient environment thereof warranting attention. Such ambient environment changes can entail fibrous tissue growth over the microphone membrane/diaphragm, weight gain or weight loss, etc. Note further that the hearing prosthesis can be configured to utilize the techniques detailed herein to indicate that the hearing prosthesis itself has experienced a change (or both). That is, instead of the ambient environment changing, the implantable microphone could become damaged or the like (due to shock), causing, for example, the transfer function of the diaphragm/microphone to have changed. Note further that in at least some exemplary embodiments, it is not necessary for the hearing prosthesis to indicate or otherwise provide data indicative of the type of change that has occurred. It is enough that the hearing prosthesis can provide an indication that a change has occurred that warrants some form of attention based on the utilization of the output from the microphone external recipient, according to the teachings detailed herein and/or variations thereof.

Figure 11B:
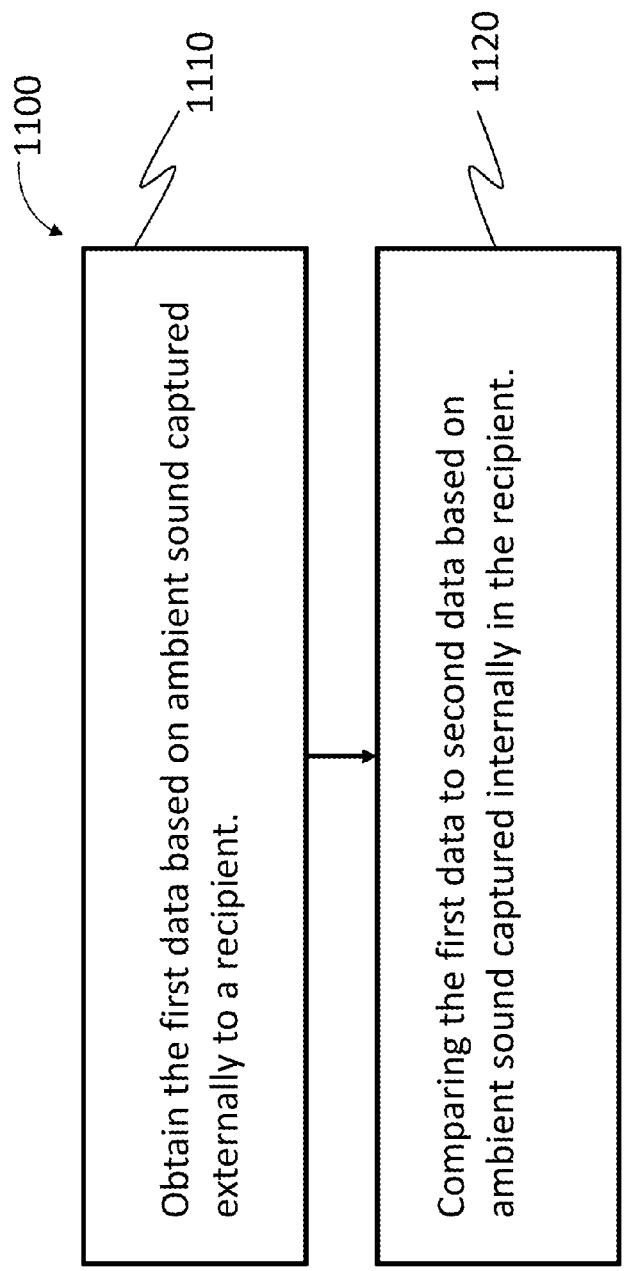
FIG. 11B depicts an exemplary flow chart according to an exemplary process accordingly to an exemplary embodiment.

In view of the above, FIG. 11B present an exemplary algorithm 1100 according to an exemplary method of an exemplary embodiment. Method 1100 includes method action 1110, which entails obtaining first data based on ambient sound captured externally to a recipient. In an exemplary embodiment, this method action is executed utilizing external microphone 427, and can be executed in a manner according to the method actions detailed above for utilizing microphone 427 to obtain data. It is noted that to execute method action 1110, it is not necessary to actually develop the first data. All that is necessary to practice the method action 1110 is to obtain the data, although actually developing the data meets the method action.

Method 1100 further includes method action 1120, which entails comparing the first data to second data based on ambient sound captured internally to the recipient. (In an exemplary embodiment, simultaneously with the execution of method action 1110 and/or in relatively close temporal proximity thereto, method 1000 further includes the action of obtaining the second data which includes developing the data, based on sound captured by the implantable microphone, where the development of the second data is performed according to, in at least some embodiments, the teachings detailed above.) In an exemplary embodiment, the sound captured internally to the recipient corresponds to sound captured by an implantable microphone, such as the implantable microphone 412 described above.

It is noted that in at least some exemplary embodiments, method 1100 can be executed remotely from the recipient. By way of example only and not by way limitation, a hearing prosthesis can be configured to enable data communication to a remote location. In an exemplary embodiment, the first data and the second data can be transmitted via a network or the like (e.g., phone network, internet) or otherwise delivered (e.g., via a flash drive through the mail) to a remote location from the recipient, where an audiologist or the like can perform the method action 1120 (where receipt of the first data through the mail corresponds to method action 1110).

Figure 11C:
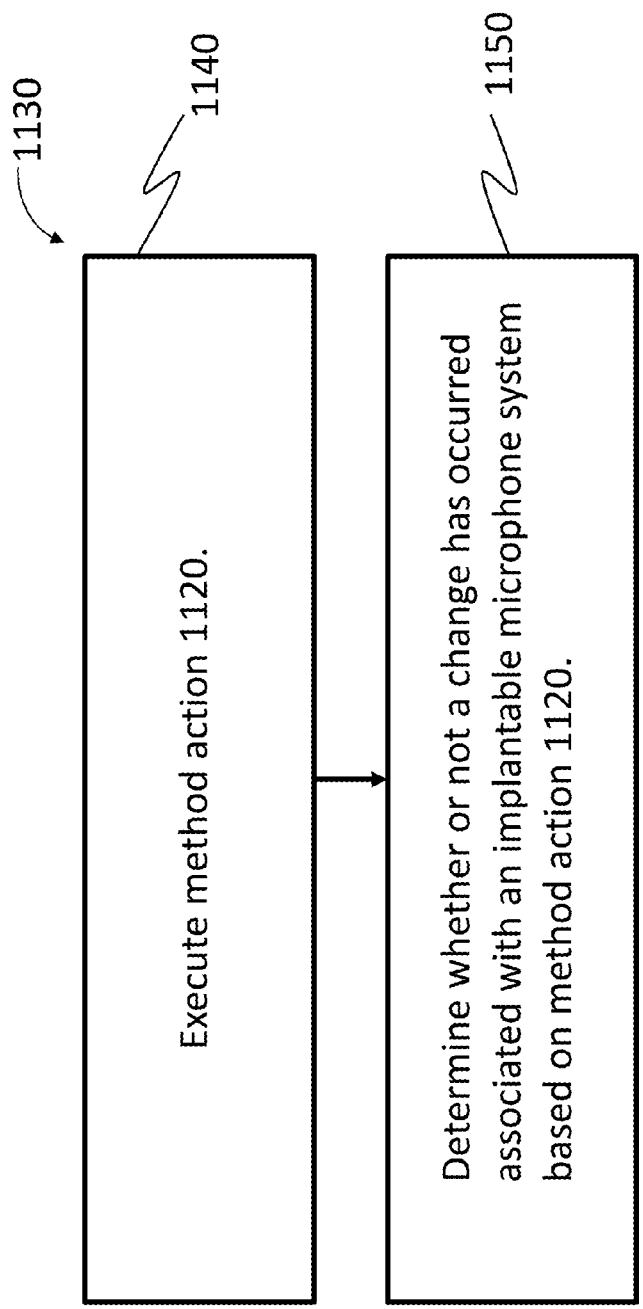
FIG. 11C depicts an exemplary flow chart according to an exemplary process accordingly to an exemplary embodiment.

FIG. 11C presents another exemplary flowchart according to an exemplary method. Flowchart 1130 includes method action 1140, which entails executing method action 1120 and, based on the execution of method action 1120, executing method action 1150, which entails determining whether or not a change has occurred associated with an implantable microphone system based on method action 1120 (the comparison of the first data to the second data).

Figure 11D:
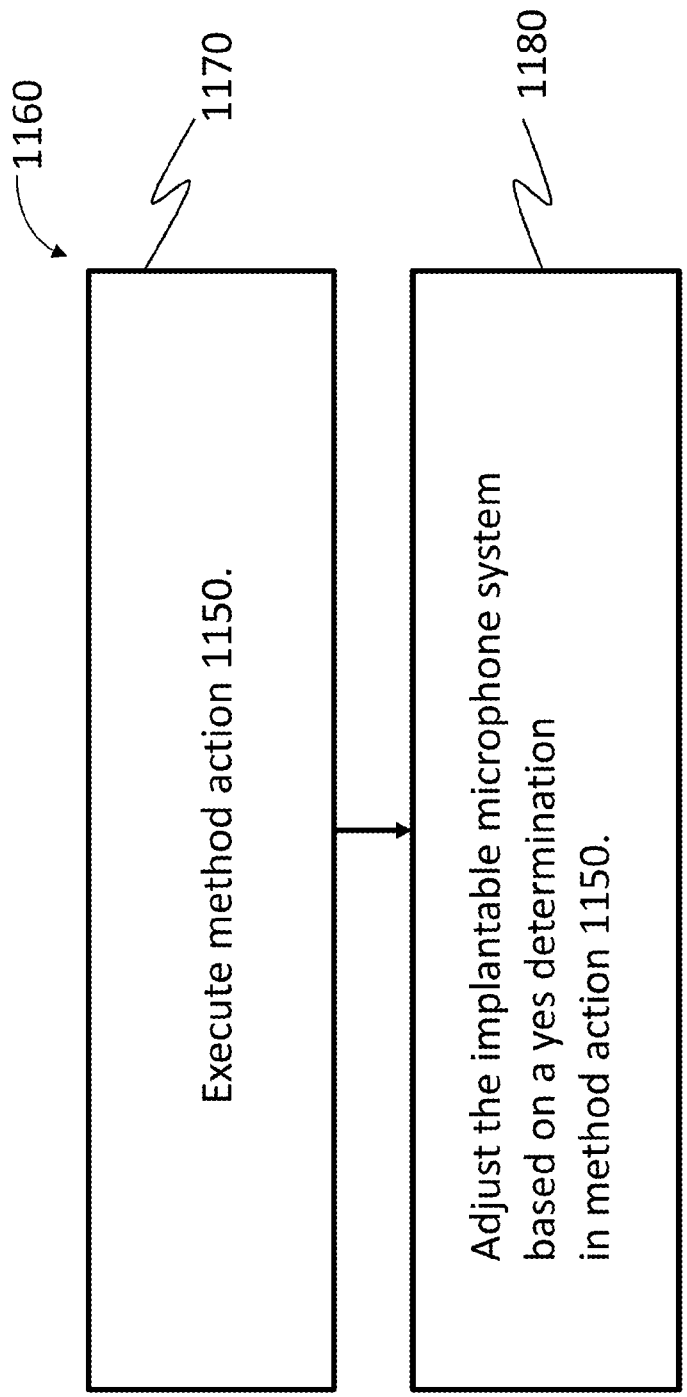
FIG. 11D depicts an exemplary flow chart according to an exemplary process accordingly to an exemplary embodiment.

FIG. 11D presents another exemplary flowchart according to an exemplary method. Flowchart 1160 includes method action 1170, which entails executing method action 1150 and, based on the execution of method action 1150, upon a determination that a change has indeed occurred associated with the implantable microphone system, executing method action 1180, which entails adjusting the implantable microphone system (e.g., adjusting a filter setting so as to compensate for the change).

Still further, in an exemplary embodiment, the teachings detailed herein and/or variations thereof can enable self-calibration of a hearing prosthesis (by the recipient and/or automatically) having an implantable microphone system, or at least a self-check of the implantable microphone. Traditionally, calibration of microphones occurred utilizing a so-called sound booth. An exemplary embodiment entails calibrating an implantable microphone system without utilizing a sound booth. In an exemplary embodiment, this can be executed by executing any one or more of the methods detailed herein and/or variations thereof, utilizing the sound captured externally to the recipient as a reference for comparison purposes.

In an exemplary embodiment, there is a system that utilizes a smartphone or a personal computer, or a remote hearing prosthesis assistant, etc., to present one or more sounds to the recipient. The sounds are captured by the external microphone and the implantable microphone of the hearing prosthesis. The data, which is developed or otherwise obtained associated with the two different microphones, is compared. Based on the comparison, a determination can be made that some form of change has occurred that affects the implantable microphone system, and an indication can be provided to the recipient or third-party. Alternatively and/or in addition to this, based on the comparison, the adjustment can be made to the implantable microphone system according to the teachings detailed herein. Such an adjustment can be performed automatically in an exemplary embodiment.

In an exemplary method of utilizing the aforementioned exemplary system, the recipient is instructed to utilize the system in a quiet environment, at least while the data is being developed. Such can have utilitarian value in that a more accurate analysis can be performed relative to that which would be the case in the more noisy environment. A calibration action can then be applied to the internal microphone system. In an exemplary embodiment, the calibration action normalizes the frequency response of the implantable microphone system to that of the external microphone system.

Referring back to the above scenarios where the data from the external microphone in the implanted microphone or obtained at different temporal periods, such can be enabled to have utilitarian efficacy when the sound that is generated by the system is of a known sound/is repeatable in a manner that effectively results in the exact same sound being reproduced. Corollary to this is that in such a scenario, there is utilitarian value in executing this in a less noisy environment relative to a more noisy environment.

It is further noted that while the aforementioned system utilizes a machine generated sound, in an alternative embodiment, other, more common sounds can be utilized. By way of example, the recipient can execute the methods during normal use, such as when the recipient is at a conference, taking a deposition, etc., when there will be extended periods of speaking. In this regard, during such events, the recipient can execute one or more or all of the methods detailed herein to calibrate or otherwise adjust the implantable microphone system to correlate the performance of that system with the external microphone.

It is noted that the aforementioned methods can be executed in a manner that provides a binary result. That is, the methods can be executed such that the recipient and/or third-party given indication that the implantable microphone system is in proper calibration or that the implantable microphone system is in need of calibration or some variation thereof.

With reference back to the aforementioned exemplary system, in at least some exemplary embodiments, the hearing prosthesis can be configured to perform one or more or all of the method actions detailed herein and/or variations thereof, automatically and/or upon manual initiation (which can include a verbal command to initiate one or more of these method actions). Alternatively and/or in addition to this, in an exemplary system, a remote device, such as a smartphone, a personal computer, a remote hearing prosthesis assistant, and/or or some other form of processing device, can be configured to perform one or more or all of the method actions detailed herein. By way of example, data from the various microphones can be transmitted via wireless and or a wired link.

As noted above, in some exemplary embodiments, there are method actions detailed herein that can be executed remotely from the recipient having the implanted microphone. Such can enable, by way of example, diagnostic techniques. These techniques can be utilizable by the recipient and/or a clinician/audiologist.

By way of example, the teachings detailed herein and/or variations thereof can be utilized in the performance of regular in-clinic calibrations with the recipient. As detailed above, some exemplary embodiments have utilitarian value in that a sound booth is not necessary. However, some exemplary embodiments can utilize the sound booth if such is available.

In an exemplary method, the results of the aforementioned method actions can be logged. This can have utilitarian value where the aforementioned method actions are repeated over a period of time, so that data associated with changes that affect the implanted microphone system can be compiled over this period of time. Based on the data, changes that affect the implanted microphone system can be identified and/or trends can be identified. By way of example only and not by way limitation, the methods detailed herein can be repeated in a manner analogous to how an audiologist or the like monitors the results of a recipient's hearing tests. Any sudden changes can be considered indicative of a change in the microphone due to physiological or other external factors. For example, a relatively sudden change can be indicative of infections leading to fluid build-up and/or scar tissue formation. Such a change can be indicative of an external impact over the microphone resulting in deformation of the microphone diaphragm that changes the frequency response thereof. Accordingly, in an exemplary embodiment, revealing the logged data developed over a period of time can provide an indication that the recipient should be checked for one or more of the aforementioned physical phenomena, or other physical phenomena that could affect the performance of the implanted microphone system. Thus, an exemplary method entails checking the recipient for such phenomena, based on an evaluation of the logged data. Corollary to this is that in an exemplary embodiment, an audiologist or other healthcare professional/clinician can counsel the recipient regarding the performance of the implanted microphone system based on the logged data.

Note further that an exemplary embodiment includes executing one or more or all of the method actions herein intra-operatively to validate that the microphone is functioning properly/is functioning in a sufficiently utilitarian manner and/or to determine that the microphone system is not functioning properly/is not functioning in a sufficiently utilitarian manner. Accordingly, in an exemplary embodiment, there is a method that entails executing one or more or all of the method actions detailed herein and/or variations thereof while the recipient of the implantable microphone system is being operated on to implant the implantable microphone system in the recipient and evaluating, based on the results of the method, the implanted microphone system, and/or, based on the evaluation, determining whether or not the implanted microphone system should remain implanted in a recipient.

Figure 11E:
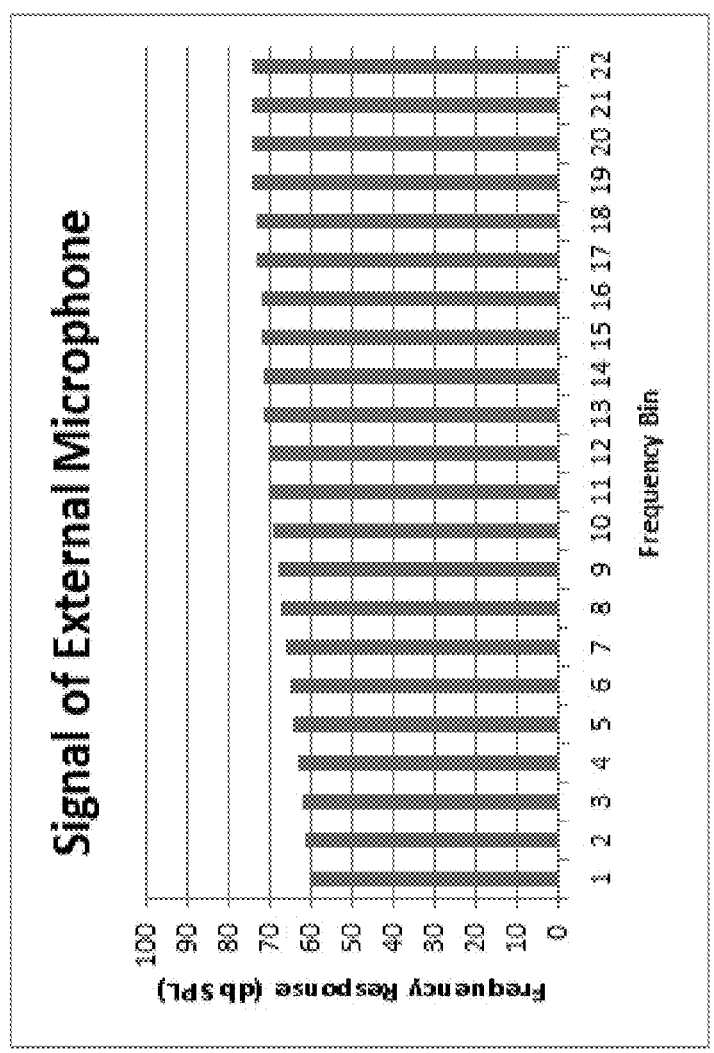
FIGS. 11E and 11F are exemplary collected data according to an exemplary scenario of an exemplary embodiment.
Figure 11F:
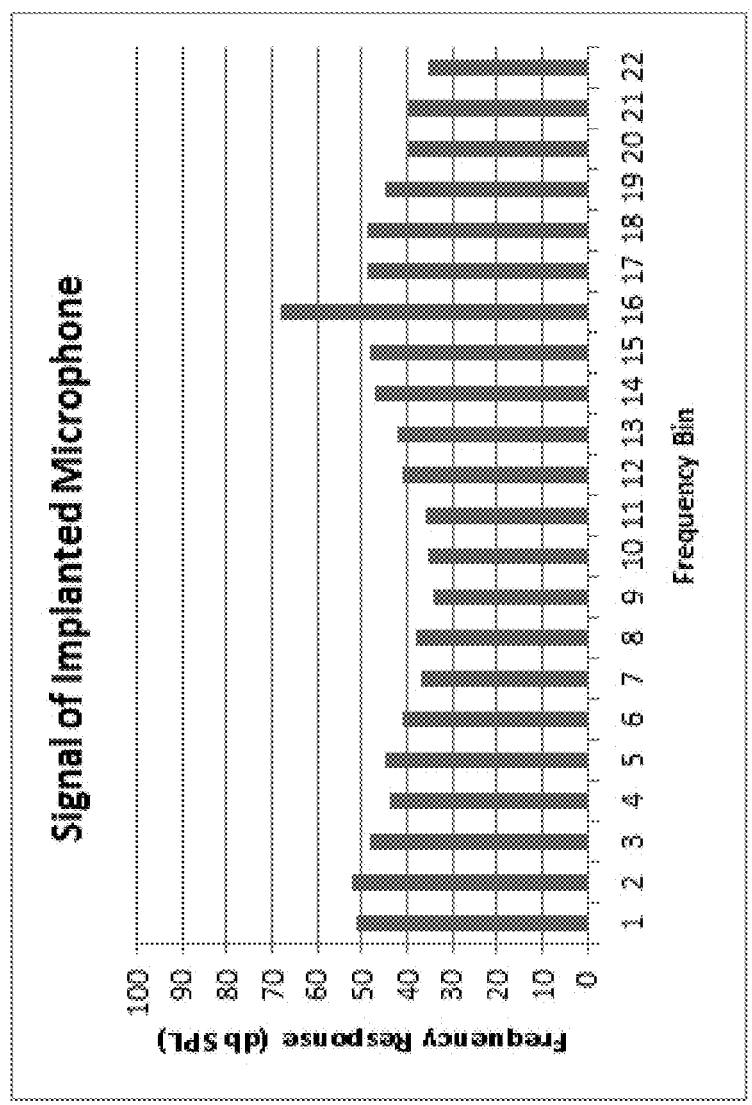

As detailed above, an exemplary embodiment entails comparing the data from the external microphone to the data from the implanted microphone. In an exemplary embodiment, the data is obtained by operating the hearing prosthesis in a so-called invisible hearing mode where the implantable microphone system is utilized to capture sound and a hearing percept is based on the captured sound. Meanwhile, the external microphone, which can be a part of a behind the ear device or the like, or a remote microphone of the hearing prosthesis, also captures that ambient sound at the same time. The data from the respective microphones is saved in some format so that it can be compared. Alternatively and/or in addition to this, the data can be compared in real time (e.g., the data is not saved in some embodiments), and based on the comparison, adjustments can be made to the implantable microphone system. FIGS. 11E and 11F present exemplary data for a temporally corresponding period (the same processing cycle corresponding to a fraction of a Hz) from the external microphone and the implanted microphone.

Figure 11G:
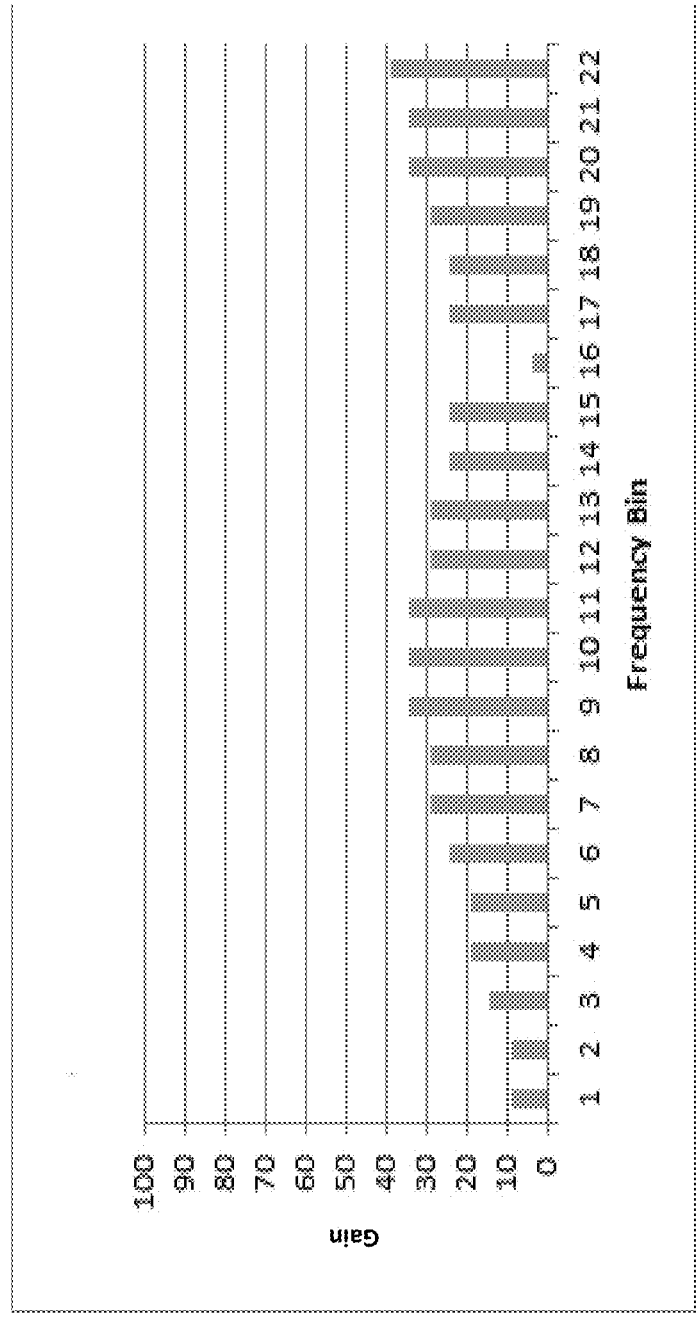
FIG. 11G is an exemplary gain regime developed in an exemplary scenario based on the data of FIGS. 11E and 11F.

As can be seen, the data has been divided into frequency bands (bins) for the processing period at issue. The exemplary embodiment entails comparing the frequency sub-data for one or more of the frequency bands of the external microphone to that of the implanted microphone (which includes comparing the data of the implanted microphone to that of the external microphone). This comparison can be done by any device, system, and/or method that can enable the comparison. In an exemplary embodiment, this can be performed by the hearing prostheses (the implantable component and/or the external component) and/or by a remote device (e.g., laptop computer, smartphone, etc.). In an exemplary embodiment, the comparison results in a determination of a frequency based gain having utilitarian value that can be applied to a given frequency channel of the implanted microphone system that will result in an outlook thereof more closely corresponding to that of the external microphone. FIG. 11G presents such an exemplary gain regime across the frequency spectrum at issue for the processing period that can be applied to the sound management system as a result of the methods detailed herein and/or variations thereof. In an exemplary embodiment, this gain regime constitutes calibration data.

In an exemplary embodiment, the frequency sub-data can be compiled over a plurality of processing cycles and statistically averaged (straight averaging, weighted averaging, etc.). Indeed, in an exemplary embodiment, FIGS. 11E-11G represent statistically averaged data.

It is noted that the data of FIGS. 11E and 11F constitute an exemplary type of data obtained using the external microphone and the implantable microphone. Alternate embodiments can be implemented by obtaining other types of data, and the data can be broken out differently (more or fewer frequency bands (bins), etc.). Further, it is noted that in some embodiments, not all frequencies are compared to each other, or at least not all frequencies are adjusted in the resulting exemplary gain regime.

Any data manipulation technique can be utilized to develop the gain regime that is to be applied to the sound management system, including straight addition, Fourier transfer, etc. In this regard, while some embodiments aim to replicate the resulting signal outputted from the external microphone (or the resulting hearing percept based on that signal), other embodiments do not specifically replicate the signal (or the resulting hearing percept based on that signal), but instead modify the signal from the implantable microphone utilizing an algorithm based on the data obtained from the external microphone in a manner that is deemed utilitarian. Moreover, it is noted that while the above has been explained in terms of a gain adjustment regime, alternate embodiments can utilize other types of regimes to implement the teachings detailed herein.

A filter system and/or a filter array can be utilized to implement a regime that will adjust the sound management system such that the resulting hearing percept based on the implanted microphone more closely corresponds to that which would result if the hearing percept was based on the external microphone. In this regard, a variable filter system can be utilized, where the filter coefficients are adjusted based on the comparison between the data from the external microphone and the data of the implantable microphone and subsequently set, or at least utilized as a baseline—some embodiments utilize an adaptive filter system—the system can be configured to adapt from the baseline. The filter system that is utilized can have specific filters for each frequency band (and each band can have a set filter coefficient), or can be such that a plurality of frequency bands can be filtered by a given filter. Indeed, in some exemplary embodiments, the frequency spectrum can be bifurcated and/or trifurcated (e.g., into an upper, middle and lower frequency range), etc., and the adjustment regime can adjust each divided group differently.

In an exemplary embodiment, the sound management system is configured such that any adjustment to the system that will result in an output thereof that more closely corresponds to that of the external microphone is implemented in a gradual manner, or, more accurately, the adjustments are applied in a gradual manner (although other embodiments implement such in an abrupt manner). For example, as noted above, the data of FIGS. 11E and 11F constitute data for one single temporal period. Assuming that the differences represented by these figures are generally normal and do not vary too quickly over time (e.g., the data of the FIGS. would be generally consistent for other temporal periods, and any variations would happen slowly), the adjustment regime applied to the system would generally make the same scale of adjustments over those periods. However, if the output of the implantable microphone differed greatly from that of FIG. 11F (and also differed in a more significant manner from that of FIG. 11E), at least within a short period of time, the resulting adjustment to the system would be of a larger scale to achieve a result that more closely corresponded to that of FIG. 11F. Thus, an exemplary embodiment can include an adjustment regime that limits the adjustment of the system to a certain amount for a certain period, and after that period has elapsed, allows for additional adjustment (this may result in multiple periods of partial adjustment until the full adjustment is realized). This can have utilitarian value in that a more smooth hearing sensation is achieved and/or the likelihood of feedback occurring is reduced, etc. By way of example only and not by way of limitation, in the scenario where the adjustment regime is a gain regime, the sound management system can be configured such that no single channel is adjusted by more than a given amount (e.g., 5 dB, 10 dB, 15, dB, etc.). Alternatively, the first adjustment could be a first amount (e.g., 5 dB), and the second adjustment could be a second amount different from the first amount (e.g., 10 dB).

In an exemplary embodiment, the gain regime that is developed as a result of the methods detailed herein can be periodically updated or otherwise varied during a given temporal period to quasi-continuously adjust the implanted microphone system based on the output from the external microphone. In an exemplary embodiment, the comparison can be initiated by a determination that the recipient has changed environment conditions (e.g., a determination that the recipient is an aircraft, a determination that the recipient is in an urban environment, a determination that the recipient is jogging, etc.). Such can be based on the use of a so-called scene classifier.

Any reason or rationale to perform the method actions detailed herein on whatever basis to adjust or otherwise calibrate the implanted microphone system can be utilized in at least some embodiments.

As noted above, in an exemplary embodiment, the external microphone is a microphone of a behind the ear device, or is part of an external component of the hearing prosthesis (e.g., that may or may not include an external sound processor in addition to any implanted sound processor). In an exemplary embodiment, the methods detailed herein can be executed while the recipient is wearing the external component. Indeed, in an exemplary embodiment, the methods detailed herein can be executed while a hearing percept is evoked based on the output from the external microphone (e.g., the implantable microphone is utilized for data collection purposes). Alternatively and/or in addition to this, in an exemplary embodiment, the methods detailed herein can be executed while a hearing percept is evoked based on the output from the implantable microphone system, where the output from the external microphone is utilized in a manner analogous to wartime submarine periscope use (brief up periscope (microphone on) periods followed by more lengthy down periscope (microphone off) periods).

Corollary to the above is that in an alternate embodiment, off-line comparison of the data can be utilized to execute the methods detailed herein. In an exemplary embodiment, the hearing prosthesis and/or other components associated with the systems utilized to implement the teachings detailed herein are configured to take recordings of the output from the various microphones, or at least record data based on the output from the various microphones, and store such data for later use. In an exemplary embodiment, such actions are executed, followed by the action of obtaining a more powerful processor than that which is available in the hearing prosthesis system to execute the comparison and/or determination actions and/or the war the more processor intensive actions associated with the methods detailed herein and/or variations thereof.

Alternatively, in an exemplary embodiment, the data collection/recording actions are executed, followed by executing one or more or all of the subsequent method actions when more power is available/less power intensive operations are being executed by the system relative to that which was the case at other temporal periods, such as at or proximate the data collection/recording periods. Accordingly, in an exemplary embodiment, the hearing prosthesis can include nonvolatile memory in which the aforementioned data is stored such that it can be accessed for later use according to the teachings detailed herein and/or variations thereof.

In an exemplary embodiment, the data collection occurs during temporal periods where the recipient is in a more quiet environment/controlled environment relative to that which would be the case during normal use. Accordingly, in an exemplary embodiment, the aforementioned scene classifier or the like can determine that the environment is one that will provide utilitarian results, or at least more utilitarian results relative to another environment, with respect to data collection to implement the teachings detailed herein, and automatically initiate data collection according to the teachings detailed herein. Alternatively, and or in addition to this, in an exemplary embodiment, the scene classifier can provide an indication to the recipient of the aforementioned utilitarian environment, and the recipient can manually enable the data collection and/or other methods detailed herein.

Moreover, the teachings detailed herein can have utilitarian value in other areas, such as when combined with other technologies. For example, in addition to the utilization of the teachings detailed herein and/or variations thereof to address or otherwise account for a variation in a surrounding of the recipient, that impacts the operation of the transducer system 480 (or other aspect of the hearing prosthesis system 400), an exemplary embodiment can utilize the teachings detailed herein and/or variations thereof to adjust the filters of the noise cancellation sub-system 460 to filter different signals from microphone 412 originating from different sounds in different manners based on the classification of the noises. More specifically, there are types (classes) of noises that will be received by the implanted microphone 412 that are often unwanted to be heard by the recipient. By way of example only and not by way of limitation, external mechanical noise, such as by way of example only and not by way limitation, hair scratching, is often difficult to effectively filter out. In this regard, without the teachings detailed herein, unwanted hearing percepts based on the external mechanical noise will be evoked by the hearing prosthesis system 400, albeit with possible attenuation. An exemplary embodiment utilizes the algorithms developed utilizing the external microphone with the hearing prosthesis system 400 and the data collection mode to filter out, at least partially, this external originating mechanical noise.

Figure 12:
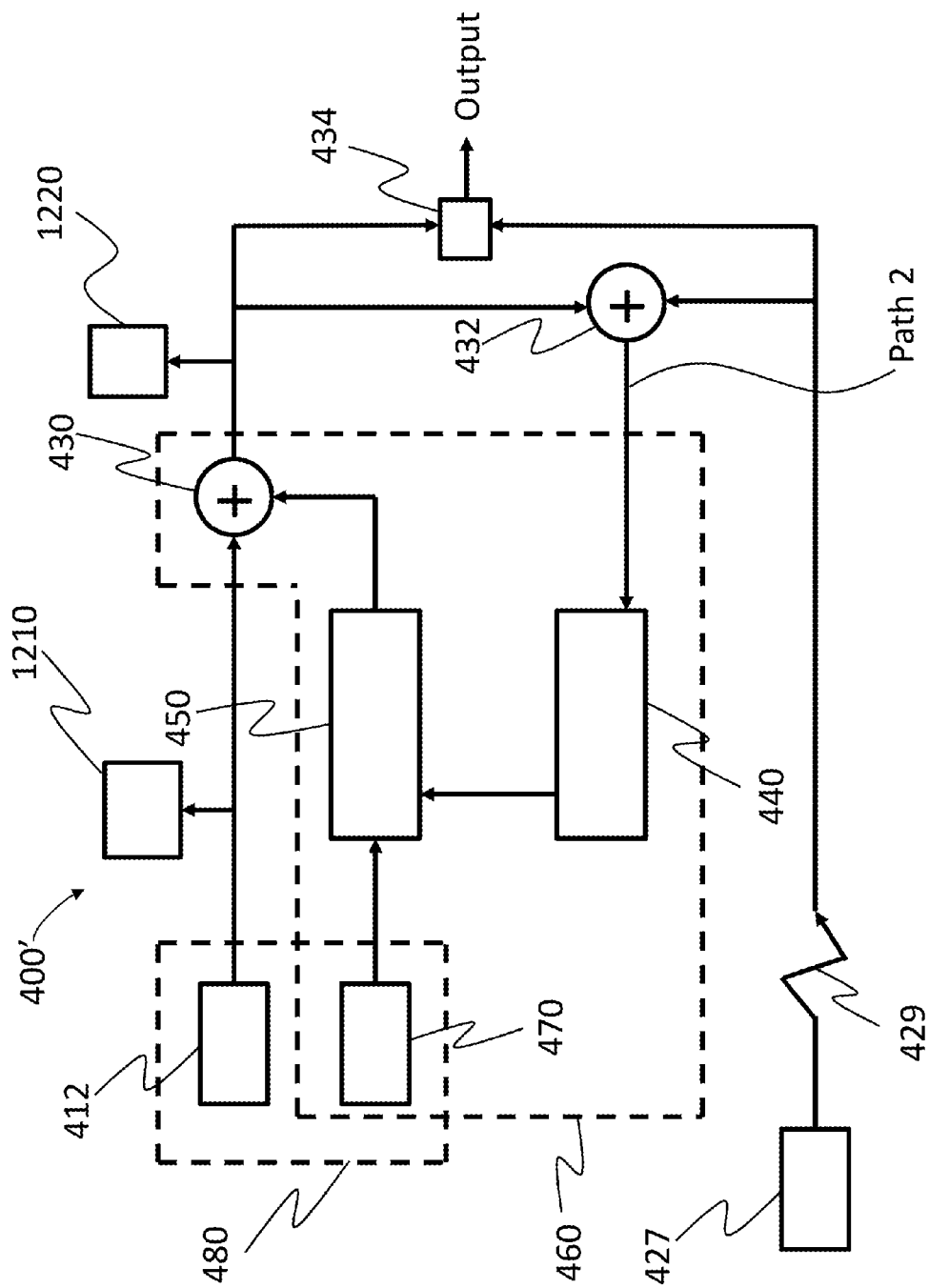
FIG. 12 functionally depicts another exemplary embodiment of a system that is usable in the hearing prosthesis of FIG. 1.

The teachings detailed herein can have utilitarian value in other areas, such as when combined with other technologies. For example, in addition to the utilization of the teachings detailed herein and/or variations thereof to address or otherwise account for a variation in a surrounding of the recipient that impacts the operation of the transducer system 480 (or other aspect of the hearing prosthesis system 400), an exemplary embodiment can utilize the teachings detailed herein and/or variations thereof to adjust the filters of the noise cancellation sub-system 460 to filter different signals from microphone 412 originating from different sounds in different manners based on the classification of the noises. More specifically, there are types (classes) of noises that will be received by the implanted microphone 412 that are often unwanted to be heard by the recipient. By way of example only and not by way of limitation, external mechanical noise, such as by way of example only and not by way limitation, hair scratching, is often difficult to effectively filter out. In this regard, without the teachings detailed herein, unwanted hearing percept based on the external mechanical noise will be evoked by the hearing prosthesis system 400, albeit with possible attenuation. An exemplary embodiment utilizes the algorithms developed utilizing the external microphone with the hearing prosthesis system 400 and the data collection mode to filter out, at least partially, this external originating mechanical noise More specifically, referring now to FIG. 12, an exemplary embodiment includes the hearing prosthesis system 400', which is a modified version of the hearing prosthesis system 400 of FIG. 3B. In an exemplary embodiment, hearing prosthesis system 400' has all of the functionality of the hearing prosthesis system 400 detailed above (some features have been removed from FIG. 12 for purposes of clarity (e.g., many of the paths), while further including the ability to classify input sound inputted into the implantable microphone 412. In this regard, the hearing prosthesis system 400' includes one or more classifiers, represented by classifiers 1210 and 1220. Alternatively and/or in addition to this, the filter control unit 440 can be a classifier. Further along these lines, in an exemplary embodiment, the filter control unit 440 and/or one or more of classifiers 1210 or 1220 are configured to identify the presence of a specific event (e.g., external mechanical noise being generated and captured by the implantable microphone 412) based on the transduced energy outputted by the transducer system 480. These classifiers can classify the output signal(s) from the transducers as having content corresponding to a known class of sound (e.g., external mechanical noise) and/or not having such content. It is noted that identification of the presence of a given class of content encompasses identification of the absence of a given class of content, at least in view of the binary nature of the presence/absence thereof. Any arrangement that can enable the identification of the presence of a given class of content in the output for the transducer system 480 can be utilized in at least some embodiments.

In an exemplary embodiment, the hearing prosthesis system 400 can be utilized in the external microphone-based mode while also in the data collection mode to develop data in accordance with the teachings above. The hearing prosthesis system 400 can be trained such that respective utilitarian algorithms/respective utilitarian parameters are developed for respective classes of sound, which algorithms are stored in a memory of the hearing prosthesis system 400. When the classifier determines that an input sound corresponds to a given classification, the hearing prosthesis system 400 can change from using one set of operational parameters of the noise cancellation sub-system 462 another set of operational parameters of the noise cancellation sub-system 460, the another set of operational parameters of the noise cancellation sub-system 460 the hearing parameters being developed according to the teachings detailed herein utilizing the hearing prosthesis system 400 in the external microphone-based mode while also in the data collection mode, where the another set of operational parameters is linked to this given classification a sound.

Accordingly, in at least some exemplary embodiments, if the control unit 440 and/or classifiers 1210 or 1220 determines that there exists a given class of noise content in the outputs of the microphone 412 and/or the accelerometer 470 (thus "classifying an input sound inputted into the implantable microphone), the control unit 440 can control the system such that the hearing prosthesis system 400 is set to utilize specific operational parameters of the noise cancellation sub-system based on this classification, which set specific operational parameters are different than other operational parameters previously utilized by the hearing prosthesis system (e.g., operational parameters that are utilized during normal usage where the specific type of sound classified by the classifiers is usually not present). Thus, in an exemplary embodiment, the hearing prosthesis system 400 is configured to initiate the setting of the so developed operational parameters based on the classification of the input sound. In an exemplary embodiment, the operational parameters that are set based on the classification are operational parameters that are based on input from the external microphone 427 developed in accordance with the teachings detailed herein.

Corollary to the above is that an exemplary embodiment, there is a method that includes developing first data based on ambient sound captured externally to a recipient (e.g., by operating the hearing prosthesis system 400 in the external microphone-based mode while also in the data collection mode as detailed above) and controlling the noise cancellation system of implantable sound capture system of the hearing prosthesis system 400 based at least in part on the first data. The method further comprises the action of controlling the noise cancellation system by adjusting filters of the noise cancellation system based on a determination that the implantable sound capture system is receiving a first class of sound (e.g., sound originating from an external mechanical noise) as compared to a second, different, class of sound. In this method, ambient sound used to develop the first data was captured at the same time as an occurrence of the first class of sound.

Thus, in at least some exemplary embodiments, the hearing prosthesis system 400 can be configured to transition from a first mode of operation to a second mode of operation based the determination that sound captured by the transducer system 480 includes a given content which is known results in an undesirable hearing percept during normal operation of the noise cancellation sub-system 460. This second mode of operation can entail controlling the filters 450 in a manner different than that of the first mode of operation, where the different control of the filters 450 is based on the training of the hearing prosthesis system 400 as detailed herein utilizing the hearing prosthesis system 400 and the external microphone-based mode while also in the data collection mode.

Exemplary classifications of content in an output signal of the transducer system 480/sound captured by the implantable microphone 412, can include, by way of example only and not by way limitation, own voice sounds, external voice sounds, hair scratching sounds, breathing sounds (bone breathing), snoring sounds (own snoring), etc.). Thus, in an exemplary embodiment, when the classifier classifies a signal as having a given content, the hearing prosthesis system 400 can recall an algorithm and/or parameter from memory, and set the filters 450 accordingly, which recalled algorithm and/or setting was developed based on using the hearing prosthesis in the external microphone-based mode and the data collection mode.

The teachings detailed herein can have utilitarian value with respect to feedback management, at least with respect to embodiments of the hearing prosthesis system 400 where the output from switch 434 is provided to or otherwise utilized by an implantable mechanical transducer that evokes a hearing percept by outputting mechanical force to tissue of the recipient (e.g., a bone conduction device, such as an active transcutaneous bone conduction device, a DACI (direct acoustic cochlear implant)/middle ear implant, etc.). More specifically, in at least some exemplary embodiments, the vibrational energy from an implanted mechanical actuator resulting from actuation thereof to evoke a hearing percept based on signals output from switch 434 of hearing prosthesis system 400 is fed back to the transducer system 480, and at least fed back into the microphone 412. The feedback path is established by body tissue (e.g., bone conduction). Thus, the feedback from the implanted mechanical actuators is body conducted feedback. Accordingly, an output of the microphone 412 includes content corresponding to actuator originating body conducted feedback. In at least some embodiments, there is utilitarian value in at least one of reducing or eliminating this content from the signal that is used to evoke a hearing percept (e.g., the signal that is sent to the implanted actuator). Because at least some embodiments of the teachings detailed herein and/or variations thereof can be practiced such that the external microphone 427 is isolated from the actuator originating body conducted feedback content (e.g., because the external microphone 427 is not contacting the recipient), the hearing prosthesis system 400 can be operated in the external microphone-based mode while also in the data collection mode to train the hearing prosthesis system 400 to account for the body conducted feedback originating from the actuator.

Figure 13:
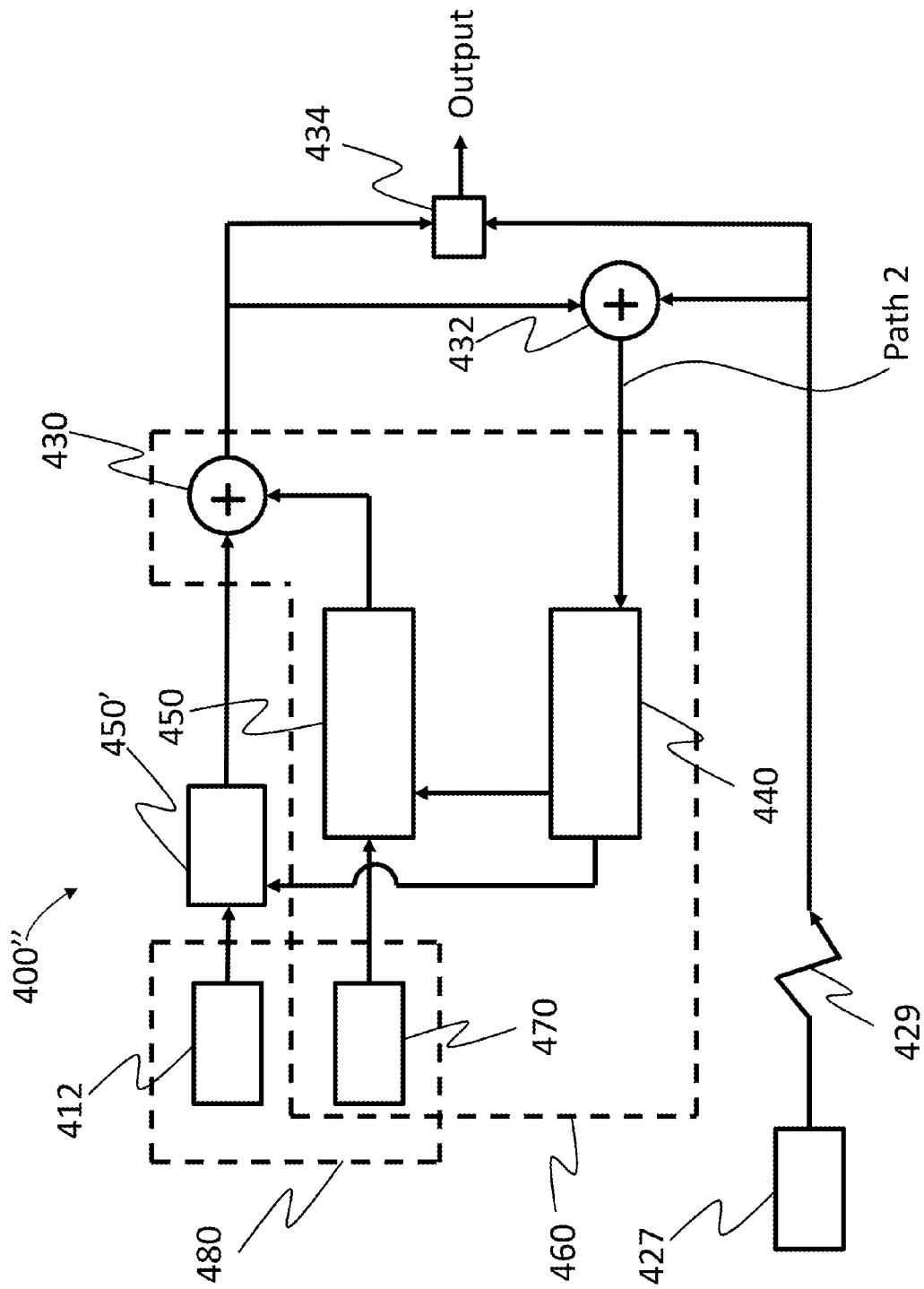
FIG. 13 functionally depicts another exemplary embodiment of a system that is usable in the hearing prosthesis of FIG. 1.

Accordingly, an exemplary embodiment includes a method of developing first data based on ambient sound captured externally to a recipient and controlling a noise cancellation system of an implantable (implanted) sound capture system based at least in part on the first data. The implantable (implanted) sound capture system is part of a hearing prosthesis that includes an implanted mechanical actuator that, when actuated, evokes a hearing percept, wherein energy from the actuation is received by the implantable sound capture system as actuator originating body conducted feedback. The method further includes controlling the noise cancellation system to at least one of reduce or eliminate actuator originating body conducted feedback content of an output of the implantable sound capture system. In an exemplary embodiment, the filters 450 are adjusted based on the data collected while utilizing the hearing prosthesis system 400 and the external microphone-based mode while also in the data collection mode such that filters of the hearing prosthesis cancel least part of the content of the feedback from the signal output by a microphone 412. It is noted that while in at least some embodiments, the filters 450 are utilized to accomplish this cancellation (including partial cancellation), in alternative embodiment, filters 450', which directly filter the output of the microphone 412, are utilized to practice this embodiment, as seen by way of example only and not by way of limitation, in FIG. 13, which depicts an alternate embodiment of a hearing prosthesis system 400". (It is noted that the arrangement of FIG. 13 can be utilized to implement other embodiments of the teachings detailed herein in at least some instances providing that such can enable the teaching detailed herein and/or variations thereof.) Any device, system and/or method that can enable this feedback reduction feature to be implemented can utilize in at least some embodiments.

It is also noted that at least some exemplary embodiments include utilizing the teachings detailed herein to calibrate a response of the transducer system 480 in response to a changed environment thereof. More specifically, in at least some embodiments, the implantable microphone 412 will not have a fixed frequency response. By way of example only and not by way of limitation, different loading conditions on the membrane and or diaphragm thereof can change the frequency response of the microphone 412. By way of example only and not by way of limitation, changes in skin thickness, growth of hair at a location above the implanted microphone 412, the wearing of a hat, changes in ambient air pressure, etc., can change the frequency response of the implanted microphone 412. Such is also the case with respect to the accelerometer 470.

Accordingly, in an exemplary embodiment, the hearing prosthesis system 400 can be utilized in the external microphone-based mode while also in the data collection mode to develop data which can be used to formulate an algorithm that accounts for such changed frequency responses. It is noted that in this exemplary embodiment, the algorithms can be utilized irrespective of whether there exists body noise content in the microphone 412. Indeed, in a sense, this embodiment can be considered normalization of the frequency response of the transducer system 480 relative to an output of the external microphone 427. Thus, in an exemplary embodiment, the above-detailed action of controlling the noise cancellation system based on data based on ambient sound captured externally to a recipient sets a frequency response of the implantable sound capture system that accommodates a change in loading on the implantable sound capture system by tissue of the recipient.

Still further, while the above exemplary embodiment has been described in terms of controlling the noise cancellation system of the hearing prosthesis to address the changed frequency response of the implanted transducer system 480, in an alternative embodiment, the noise cancellation system per se is not adjusted, but instead, signal processing techniques are provided outside of the noise cancellation system. Accordingly, in an exemplary embodiment, there is an exemplary method that entails developing second data (as distinguished from the first data developed as detailed above) based on second ambient sound (as distinguished from the first ambient sound as detailed above) captured externally to the recipient, and processing a signal (e.g., an output of microphone 412 using filter 450') based on sound captured by the implantable sound capture system based at least in part on the second data. In this exemplary embodiment, the action of processing the signal a based on sound captured by the implantable capture system accommodates a change in loading on the implantable sound capture system by tissue of the recipient that changes a frequency response of the sound capture system. That said, alternatively and/or in addition to this, an exemplary embodiment entails processing a signal based on sound captured by the implantable sound capture system based at least in part on the aforementioned first data (where, as detailed above, the noise cancellation system of the implantable sound capture system can be controlled based at least in part on this first data). That is, data that is used to control the noise cancellation system can also be used for the aforementioned signal processing, while, in an alternative embodiment, separate data that might not be used to control the noise cancellation system is used for the aforementioned signal processing.

In at least some embodiments, the teachings detailed herein and or variations thereof can be utilized to address scenarios where one or more recipient specific parameters are unknown. By way of example, the effects of skin and other recipient anatomical and clothing features on the attenuation of airborne sound before it reaches the implanted microphone, the sensitivity of the microphone to body noise, which can depend on the skin features, the sensitivity of the accelerometer to the airborne noise and/or body conducted sounds the effects of hair (e.g., hair noise) etc. Further to this end, in at least some embodiments, the teachings detailed herein and or variations thereof can be utilized to address scenarios where frequency dependent parameters change over time (e.g., due to thinning or thickening of skin, a new haircut, etc.), Which frequency dependent scenarios often have an unknown or otherwise difficult to account for impact on the noise cancellation systems of a totally implantable hearing prosthesis.

It is noted that at least some exemplary embodiments include a hearing prosthesis that is configured to train itself, in accordance with the teachings detailed above, on a periodic and/or nonperiodic schedule. In an exemplary embodiment, the hearing prosthesis 400 can be configured to train itself whenever it is receiving signal content from the external microphone 427. Alternatively, in an alternate embodiment, the hearing prosthesis can train itself only during select periods of such receipt of signal content. By way of example only and not by way limitation, this might be recipient activated training, where the training does not occur unless the recipient instructs the hearing prosthesis to do so or otherwise enables the training to occur. Alternatively and/or in addition to this, the training may be based on the contents of the inputs into the controller 440—in scenarios where the input to controller 440 has utilitarian value, the training can commence, as opposed to scenarios where the inputs into controller 440 does not have utilitarian value or otherwise has relatively less utilitarian value.

It is noted that while the teachings detailed herein are described in terms of an electrical stimulating device in the form of a cochlear implant, it is noted that alternate embodiments are applicable to other types of stimulating devices. By way of example only and not by way of limitation, the teachings detailed herein and/or variations thereof can be applicable to a bone conduction device, a Direct Acoustic Cochlear Implant, or traditional hearing aids.

As noted above, at least some of the method actions can be executed at a location remote from where another method action is located. For example, is noted that an exemplary embodiment entails executing some or all of the method actions detailed herein where the recipient of the hearing prosthesis is located remotely (e.g., geographically distant) from where at least some of the method actions detailed herein are executed (e.g., any method action detailed herein that can be executed by, for example, a computer or other processor located at a remote location). For example, the data collection actions can be executed by the hearing prosthesis 400, and the development of the parameters based on the data that is collected can be developed utilizing a laptop computer, or even a system remote from the recipients, which system can access the data of the hearing prosthesis 400 via for example the Internet or the like, and which system can communicate the developed parameters to the hearing prosthesis system 400 via for example the Internet. Providing that such can enable the teachings detailed herein and/or variations thereof, any method action herein can be executed at one location, and any method action herein can be executed at another location, and so on, providing that the teachings detailed herein and/or variations thereof can be practiced.

It is noted that any disclosure of a method action detailed herein corresponds to a disclosure of a corresponding system and/or device for executing that method action, and in at least some embodiments, automatically. It is further noted that any disclosure associated with an apparatus or system herein corresponds to a disclosure of a method of operating that apparatus. It is also noted that any disclosure of any method action detailed herein further includes a disclosure of executing that method action in an automated fashion, as well as a device for executing those method actions in the automated manner. Moreover, any disclosure of an apparatus and/or system detailed herein corresponds to a disclosure of a method of making that apparatus and/or system, as well as any method disclosed herein corresponds to a disclosure of a method of developing that method.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A hearing prosthesis, comprising:
an implantable microphone; and
a sound management system configured to receive input from the implantable microphone and output a signal based on the input, wherein
the hearing prosthesis is configured to set at least one operational parameter of the sound management system based on input from a microphone external to the recipient of the implantable microphone, wherein
the hearing prosthesis is configured to automatically adjust an operation of the sound management system to compensate for a change in a transfer function between an accelerometer of the sound management system and the implantable microphone based on input from the microphone external to the recipient of the implantable microphone.

2. The hearing prosthesis of claim 1, wherein:
the hearing prosthesis is configured to compare data based on an output signal of the implantable microphone that is indicative of sound captured by the implantable microphone to data that is based on the input from the microphone external to the recipient;
wherein the input from the microphone external to the recipient is based on sound captured by the microphone external to the recipient;
wherein the setting of the at least one operational parameter of the sound management system is based on the comparison of the output signal of the implantable microphone to the input from the microphone external to the recipient; and
the hearing prosthesis evokes a hearing percept based on the signal outputted based on the input, wherein the signal outputted based on the input is devoid of any content from the microphone external to the recipient.

3. The hearing prosthesis of claim 1, wherein:
the hearing prosthesis is configured to classify an input sound inputted into the implantable microphone from amongst a plurality of separate and distinct classifications and initiate the setting of the at least one operational parameter of the sound management system based on a first classification of the input sound and initiate a different setting of the at least one operational parameter based on a second classification of the input sound.

4. The hearing prosthesis of claim 1, wherein:
the setting of the at least one operational parameter of the sound management system is a frequency based gain regime.

5. The hearing prosthesis of claim 1, wherein:
the hearing prosthesis is configured to automatically calibrate the sound management system based on the input from the microphone external to the recipient of the implantable microphone.

6. The hearing prosthesis of claim 1, wherein:
the sound management system is a noise cancellation system; and
the hearing prosthesis is configured to train the noise cancellation system to cancel noise based on input from the implantable microphone that is based on sound captured by the implantable microphone and input from the microphone external to the recipient based on sound captured by the microphone external to the recipient.

7. The hearing prosthesis of claim 1, further comprising:
an external microphone, wherein the external microphone is the microphone external to the recipient, wherein
the hearing prosthesis is configured to evoke hearing percepts variously entirely based on output from the external microphone or entirely based on output from the implantable microphone; and
the hearing prosthesis is configured to receive a signal based on output from the external microphone such that the signal based on output from the external microphone completely bypasses the implantable microphone.

8. The hearing prosthesis of claim 1, wherein:
the hearing prosthesis is configured to evoke a hearing percept based entirely on the implantable microphone while the hearing prophesies is set with the at least one operational parameter of the sound management system.

9. The hearing prosthesis of claim 1, wherein:
the input from the microphone is received by implantable portions of the hearing prosthesis via a route that is isolated from the sound capture portion of the implantable microphone.

10. The hearing prosthesis of claim 1, further comprising:
the microphone external to the recipient, wherein the microphone is in electromagnetic communication with an implanted component of the hearing prosthesis so as to provide the input from the microphone external to the recipient to the implanted component, and thus enable the hearing prosthesis to set at least one operational parameter of the sound management system based on input from a microphone external to the recipient of the implantable microphone.

11. A method, comprising:
developing first data based on ambient sound captured externally to a recipient; and
controlling an implantable sound capture system based at least in part on the first data, wherein the action of developing first data includes:
comparing data based on an output signal of an implantable microphone of the implantable sound capture system that is based on sound captured by the implantable microphone to a signal based on the ambient sound captured externally to the recipient, wherein the sound captured by the implantable microphone originates from the same source of sound as that which originated the sound captured externally to the microphone, wherein
the implantable sound capture system includes a noise cancellation system;
the action of developing first data includes obtaining pseudo noise cancellation system operational parameters indicative of how the noise cancellation system of the implantable sound capture system should operate to cancel body conducted noise; and
the action of comparing data is included in the action of obtaining pseudo noise cancellation system operational parameters, and
the method further comprises limiting the operation of the noise cancellation system to the pseudo noise cancellation system operational parameters.

12. The method of claim 11, wherein:
the action of controlling the implantable sound capture system includes controlling a noise cancellation system thereof and includes limiting the adaptation of the noise cancellation system based on the first data.

13. The method of claim 12, wherein:
the action of limiting the adaptation of the noise cancellation system includes preventing filters of the system from adapting to have certain coefficients based on the first data.

14. The method of claim 11, wherein: the action of developing first data further includes: developing pseudo adaptive filter coefficients based on the comparison.

15. The method of claim 11, wherein:
the action of controlling the implantable sound capture system includes adjusting filters of the sound capture system based on a determination that the implantable sound capture system is receiving a first class of sound as compared to a second, different, class of sound, wherein
the ambient sound used to develop the first data was captured at the same time as an occurrence of the first class of sound.

16. The method of claim 11, wherein:
the action of controlling the implantable sound capture system calibrates the implantable sound capture system using the first data as a calibration reference.

17. The method of claim 11, wherein:
the implantable sound capture system is part of a hearing prosthesis that includes an implanted mechanical actuator that, when actuated, evokes a hearing percept, wherein energy from the actuation is received by the implantable sound capture system as actuator originating body conducted feedback; and
the action of controlling the implantable sound capture system at least one of reduces or eliminates actuator originating body conducted feedback content of an output of the implantable sound capture system.

18. The method of claim 11, further comprising:
operating the implantable sound capture system, as distinct from controlling the implantable sound capture system, based at least in part on the first data, while the implantable sound capture system is controlled based at least in part on the first data.

19. The method of claim 11, wherein:
the implantable sound capture system is part of an implantable prosthesis;
the first data is received by the implantable prosthesis in such a manner that when received the first data is (i) completely free of body conducted noise or (ii) completely based on ambient sound.

20. The method of claim 11, wherein: the action of developing first data further includes developing pseudo adaptive filter coefficients based on the comparison.

21. A system, comprising:
a noise cancellation sub-system configured to at least partially cancel a body conducted noise component from a first signal that is output of an implantable microphone, wherein
the first signal includes the body conducted noise component and an ambient sound component, and
the system is further configured to at least partially cancel the body conducted noise component using a first algorithm that is based on a second signal that temporally preceded the first signal, wherein the second signal is based on captured sound that is at least one of (i) completely free of body conducted noise or (ii) completely comprised of ambient sound, wherein
the system is configured to utilize a second algorithm, which is different from the first algorithm, to at least partially cancel the body conducted noise component upon a determination about the sound, wherein the second algorithm is based on a third signal that temporally preceded the first signal, wherein the third signal is based on a second captured sound that is at least one of (i) completely free of the body conducted noise or (ii) completely comprised of the ambient sound.

22. The system of claim 21, wherein:
the second signal is completely free of the body conducted noise and is received by an implantable component of the system.

23. The system of claim 21, wherein:
the second signal is completely comprised of the ambient sound.

24. The system of claim 21, wherein:
the noise cancellation sub-system is an adaptive noise cancellation sub-system including adjustable filters, wherein the system is configured to adjust the adjustable filters to cancel the body conducted noise component based on the second signal.

25. The system of claim 21, wherein:
the noise cancellation sub-system is an adaptive noise cancellation sub-system including adjustable filters, wherein the system is configured to adjust the adjustable filters and cancel the body conducted noise component without reliance on a feed-back loop.

26. The system of claim 21, wherein:
the system includes a classifier configured to classify sound captured by the implantable microphone; and
the determination about the sound is a determination that a classification of the sound by the classifier corresponds to a given classification.

* * * * *